United States Patent [19]
Land

[11] 3,778,140

[45] Dec. 11, 1973

[54] PHOTOGRAPHIC SYSTEM COMPRISING FILM CASSETTE INCLUDING SELF-CONTAINED PROCESSING APPARATUS AND FILM DRIVE AND PROJECTION SYSTEM CONTROLLED THEREBY

[75] Inventor: Edwin H. Land, Cambridge, Mass.

[73] Assignee: Polaroid Corporation, Cambridge, Mass.

[22] Filed: Feb. 17, 1972

[21] Appl. No.: 227,082

[52] U.S. Cl.................... 352/130, 95/13, 95/89, 352/72, 352/78
[51] Int. Cl............................................. G03c 11/00
[58] Field of Search.................. 352/78 R, 78 C, 72, 352/130, 92; 95/13, 89

[56] References Cited
UNITED STATES PATENTS

| | | | |
|---|---|---|---|
| 3,643,579 | 2/1972 | Downey | 352/78 R X |
| 2,005,737 | 6/1935 | Foster | 352/92 UX |
| 3,212,838 | 10/1965 | Martin | 352/78 R |
| 3,511,562 | 5/1970 | Leisring | 352/92 |

*Primary Examiner*—Monroe H. Hayes
*Attorney*—John W. Ericson

[57] ABSTRACT

A photographic system comprising a self-processing film cassette containing a film strip transferable between takeup and supply reels by way of a film gate. A processor is enclosed within the cassette and responds to film position and direction of motion to process exposed film during its passage from takeup to supply reels. An electrical signal generator is located in the housing and responds to the processed or unprocessed state of the film to produce an external signal for selecting the mode of operation of a film drive and projection system adapted to receive the cassette. The film drive and projection system comprises a cyclic drive system, for selectively advancing the film onto the takeup reel and then rewinding it onto the supply reel; a projection lamp; a lens; and a selectively operable shutter for the lens. If the film is unprocessed, the projection system will process it with the lens closed and lamp off, and then project the processed film and rewind it. If the film is processed, it will simply be projected and rewound.

10 Claims, 16 Drawing Figures

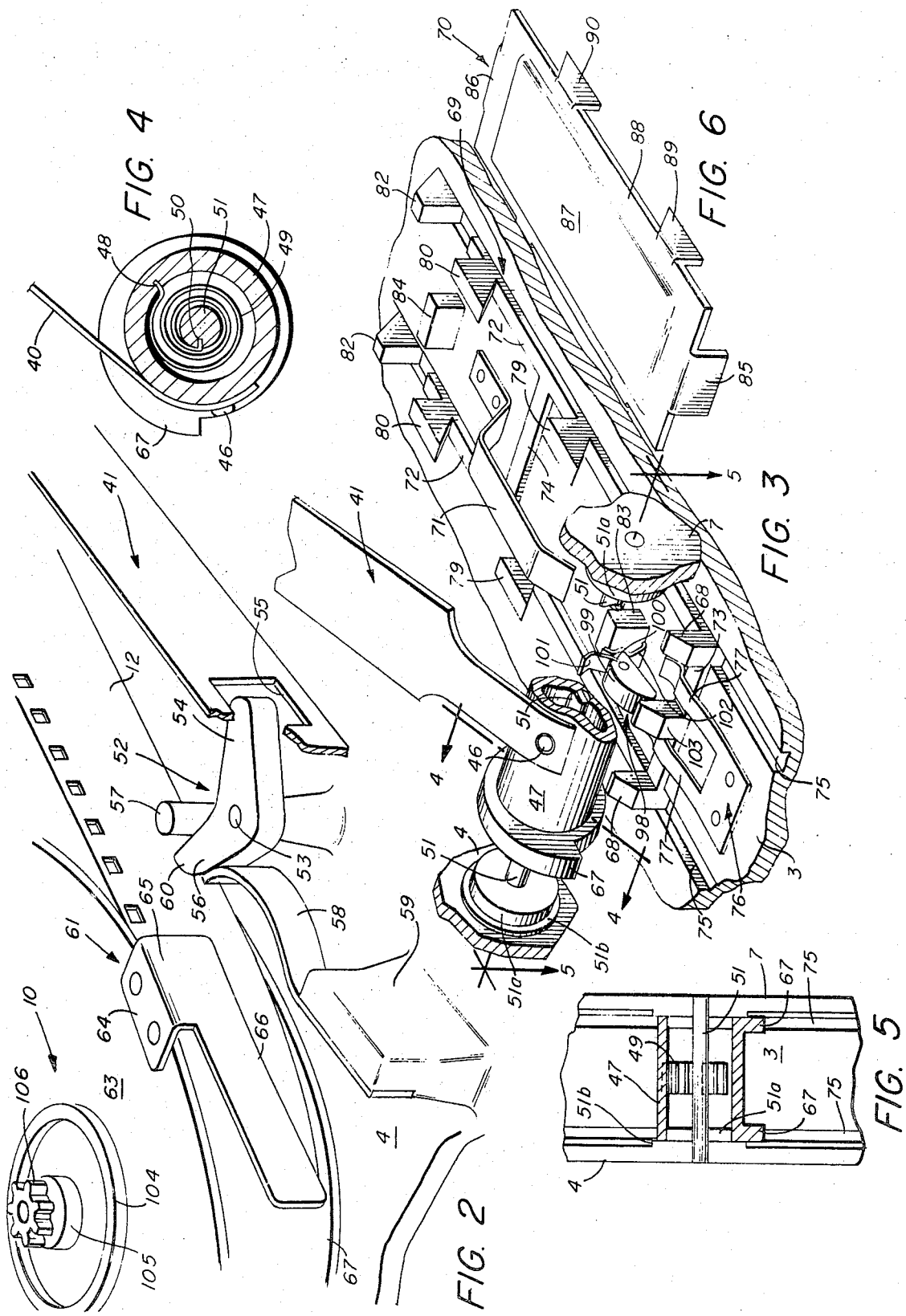

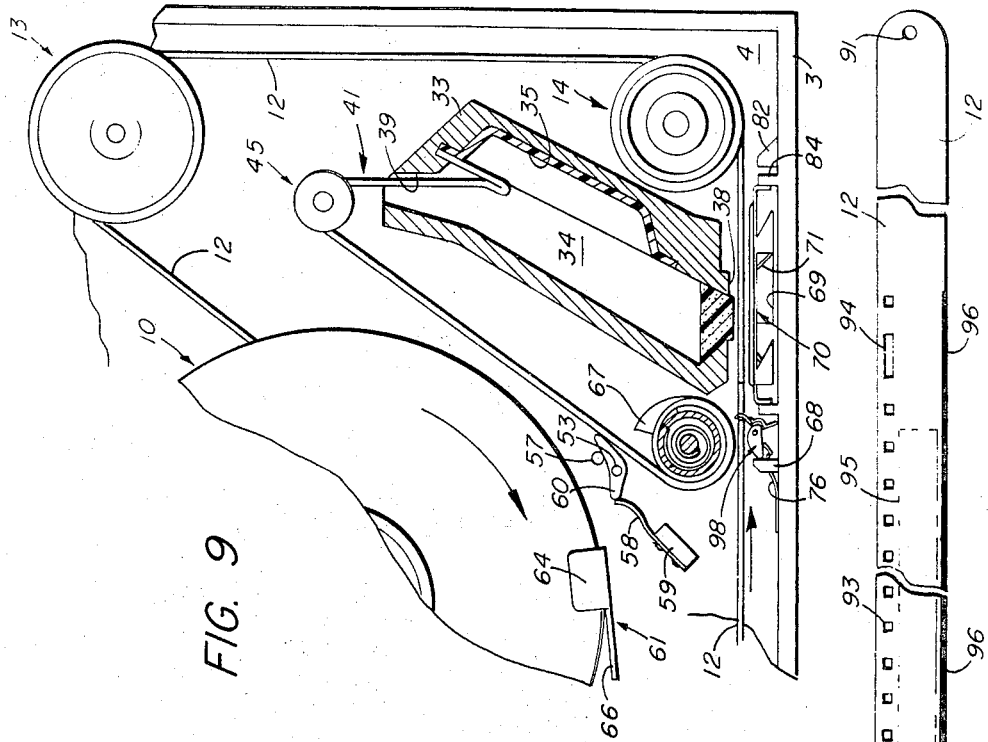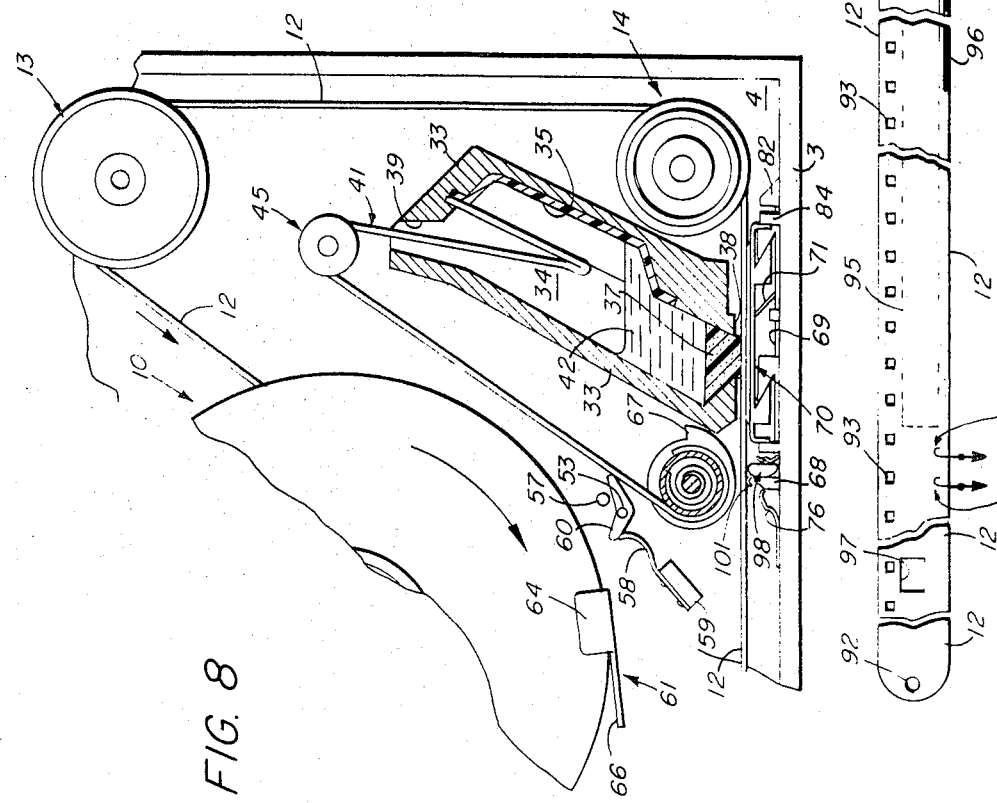

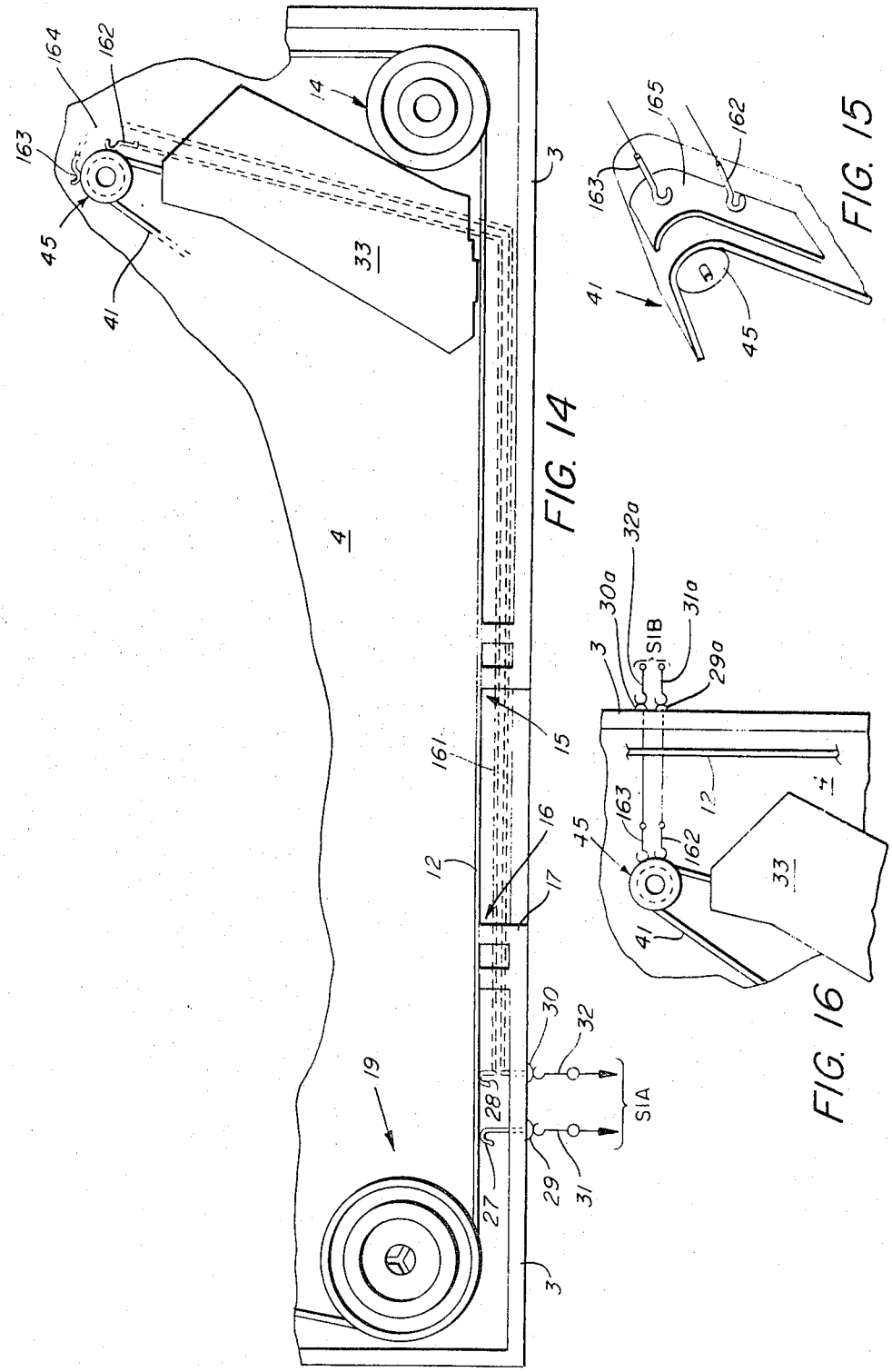

PHOTOGRAPHIC SYSTEM COMPRISING FILM CASSETTE INCLUDING SELF-CONTAINED PROCESSING APPARATUS AND FILM DRIVE AND PROJECTION SYSTEM CONTROLLED THEREBY

My invention relates to photography, and particularly to a novel photographic system for rapidly processing and projecting a series of images on a strip of roll film.

Since the discovery of photography, extensive efforts have been made to simplify the process of producing photographic images, to reduce the size and weight of the apparatus required, and to expedite the photofinishing process. A particular avenue of effort along these lines, especially relevant to my invention, is the invention and development of photographic apparatus making use of a pre-packaged image-forming system. Such an image-forming system comprises a packet insertable in a camera and containing not only photosensitive material for recording latent images in the camera, but also the photofinishing composition necessary to produce a permanent visible image, and the recording medium upon which the final image is to be produced and displayed. By that arrangement, the photographer is enabled to produce a finished image within seconds of the exposure of the photosensitive material. One fruit of this effort has been the proposal of a photographic cassette, particularly useful for motion picture photography, but also of use in the production of still photographs, comprising means for forming transparencies in sequence on a strip of roll film.

The proposed cassette would include a supply of roll film, and film transport means for moving the film backwards and forwards through a film gate, for exposure in a camera and projection and rewinding in a projector. The cassette would also include a processing station adapted to apply photofinishing composition to the exposed roll, so that finished transparencies could be produced immediately after exposure of the roll.

Prior to my invention, so far as I am aware, such apparatus as has been constructed along the lines of that proposal has been externally programmed; i.e., the various steps required to activate and engage the processing apparatus contained in the cassette with the film have been carried out in response to forces applied by external means to the apparatus in the cassette through light-baffled apertures in the cassette. To date, however, no cassette constructed along those lines has come into common use.

The various functions that must be performed in the use of a cassette of the kind proposed can best be discussed in the context of the photographic system in which it is to be employed. Functionally, this system may be considered to comprise three instruments, the camera, the cassette, and the projector; and the operator, who can manipulate these instruments to produce photographs. Responsibility for the various manipulations that take place during the production and projection of photographic images with this system can be variously divided among those four active elements.

In general, it is desired to keep the camera as simple and compact as possible, so that it will be convenient to carry about and use. Toward that end, it is convenient to require the camera only to accept the cassettte and expose the film while incrementally advancing it from the supply reel to the takeup reel.

After exposure, the cassette is removed from the camera. Numerous choices are then available that govern the manner in which the exposed film is processed and prepared for projection.

Some of the steps inherently necessary in processing the film are the release of the initially sealed processing composition in the cassette, and the spreading of the released composition into a thin and uniform coat on the film, while moving the film relative to the processing station. It is also desirable that the processor be out of contact with the film during its exposure, or during operations such as projection or rewinding of the film subsequent to processing. Thus, steps of engaging and disengaging the coating apparatus are desirable.

The intelligence and energy necessary to carry out these processing steps have previously been supplied either by the operator or by the projector. Either assignment of responsibilities generally results in a bulky, and therefore relatively heavy, cassette; in a complex, cumbersome and costly projector assembly; or both.

The difficulty arises out of the need for supplying the necessary intelligence and energy to the components within the cassette through light-baffled apertures in its housing. When it is sought to supply these quantities by manual operation, it is essential to provide for the supply and utilization of forces measured in pounds, rather than grams, because the hands and the judgment of the operator are but ill-suited to the application of small forces through delicate apparatus. The provisions for withstanding and transmitting such forces necessarily tend to make the construction both heavy and bulky.

Similar problems occur when it is sought to apply the necessary intelligence and forces to the cassette from the projection apparatus, since it is required for this purpose to make a number of mechanical connections through the cassette housing when the cassette is inserted in the projector. The use of small and delicate parts for this purpose is precluded by the necessity for withstanding the operations of manually inserting and withdrawing the cassette while making those connections. At the same time, the projecting apparatus becomes complicated by the requirements for exchanging information and energy with the cassette that will enable the projector to carry the film in the cassette through the processing cycle, while actuating the several elements of the processing apparatus so that the process is carried out in the desired sequence and with appropriate timing.

The objects of my invention are to simplify the construction of photographic transparency systems in which a film cassette of the self-processing type is employed, while rendering the required apparatus lighter in weight and more reliable; to reduce the functional requirements on the projection system, and to require less judgment, skill, and time on the part of the operator in carrying out the photographic process prior to viewing of the completed transparencies.

Briefly, the above and other objects of my invention are attained by a photographic system comprising a film cassette containing a processing system in which the film processing sequence is governed primarily by elements located within the cassette, and is powered simply by inputs serving to transport the film back and forth in the cassette. Since the processing elements are located within the cassette housing and need only exchange the relatively small amount of energy required for processing purposes, they can be much smaller and lighter in weight than corresponding externally actuated elements, while performing their functions with greater reliability and within a smaller housing.

Cassettes constructed in accordance with my invention make it possible to greatly simplify the construction of the viewer, which is basically required only to perform the functions of a conventional projector, with simple modifications to provide appropriate control of the projection lamp, and a suitable shutter for the projection lens. Specifically, a film drive and projection system constructed in accordance with my invention comprises a reversible drive system operable in but one basic cycle, which may be carried out either in a processing environment, in which the system simply acts as a film drive system in a lighttight housing, or in a normal projection environment, for use with processed film. When a cassette containing unprocessed film is inserted, the basic drive cycle is repeated twice; once for processing the film, and again, for projecting and rewinding the processed film. A cassette containing processed film is driven only through one cycle, for projection and rewinding.

The mode of operation of a film drive and projection system in accordance with my invention is selected very simply, by a binary electrical signal provided by a signal generator in the cassette that will advise the system in which mode to proceed. In accordance with one embodiment of my invention, this signal generator comprises a pair of contacts adapted to engage the film, and to respond to selective bridging of the contacts by one or more metallic foil strips on the film by presenting a signal comprising either a closed circuit or an open circuit to the projector.

The basic condition sensed in this embodiment of my invention is the relative location of the film in the cassette; that is, if it is primarily on the supply reel, it is assumed to have been processed, and is therefore simply projected and rewound to that initial state by the film drive and projection system. On the other hand, if the film is primarily on the takeup reel, that implies that it has been exposed in the camera. The signal produced by the cassette in that case directs the projector to go through its normal cycle, but with the projection aperture closed and the light out, during which cycle the apparatus within the cassette causes proper sequential operation of the processing apparatus to produce finished images on the film. Having accomplished that function, the film drive and projection system is preferably arranged to proceed to treat the cassette as though it had been originally inserted with processed film, and thus to project it with the light on and the lens open, and then rewind it.

In accordance with a second embodiment of my invention, the container of processing composition within the cassette is opened by an actuator that moves from a first to a second position, and in so doing carries a conductive element with respect to a pair of contacts similar to those described above to produce an open circuit or a closed circuit in accordance with the position of the actuator. Specifically, if the actuator has not been moved, indicating that the film has not yet been processed, the film drive and projection system will be advised that the film in the cassette should be processed before projection. Alternatively, if the actuator has been moved, it is assumed that the film in the cassette has previously been processed, and need only be projected and rewound.

In accordance with a third embodiment of my invention, the signals produced as described above are combined, to produce a more positive indication that the film has been exposed, but has not yet been processed. For that purpose, both sets of contacts that are described above, one engaging the film and another engaging the actuating element by means of which the processing composition is released, are provided. These are connected in a logical AND circuit; that is, if a closed circuit has a truth value of logic 1, they are connected in series, whereas if an open circuit has a truth value of logic 1, they are connected in parallel.

A signal produced in response to the position of the film in the cassette will indeed indicate when the film has been completely, or even partially, exposed in the camera, but it may also give the same indication during film transport after the film has been processed. False operation from this cause can be avoided, but can be ignored if the second signal generator is combined with the first. Use of the signal produced in response to the position of the process composition release element gives a positive indication after the film has been processed, but as an indication that the film requires processing it has the drawback that the same indication will be produced whether or not the film has been exposed; i.e., unexposed film will respond in the same manner as exposed but unprocessed film. Combination of the two signals more positively reflects the history of the film in the cassette. Within the broader aspects of my invention, any of these indications may be employed as a process indication signal, and various forms of conventional electrical signal generators other than the open or closed contacts described can be employed.

The manner in which the apparatus of my invention is constructed, and its mode of operation will best be understood in the light of the following detailed description, together with the accompanying drawings, of various embodiments thereof.

In the drawings,

FIG. 2 is a fragmentary schematic perspective sketch, with parts omitted and parts broken away, illustrating a process composition release mechanism associated with a film spool in the cassette of FIG. 1;

FIG. 3 is a schematic perspective sketch, with parts omitted, parts shown in cross-section, and parts broken away, illustrating a portion of a pressure pad erection mechanism forming a part of the processing apparatus of FIG. 1;

FIG. 4 is a fragmentary cross-sectional view, taken substantially along the lines 4—4 in FIG. 3, illustrating a portion of the process composition release mechanism of FIGS. 1–3 on an enlarged scale;

FIG. 5 is a schematic fragmentary plan sketch, with parts omitted, parts shown in cross-section, and parts broken away, taken substantially along the lines 5—5 in FIG. 3;

FIG. 6 is a schematic perspective sketch of a pressure pad forming a part of the apparatus of FIG. 1;

FIG. 7 is a fragmentary plan view, with parts broken away, schematically illustrating a film strip useful in the apparatus of my invention;

FIG. 8 is a fragmentary plan sketch, with parts omitted, parts shown in cross-section, and parts broken away, illustrating the apparatus of FIG. 1 in a second position assumed during the processing cycle;

FIG. 9 is a schematic fragmentary plan sketch, with parts omitted, parts shown in cross-section, and parts broken away, showing the apparatus of FIG. 1 in still another position assumed during the processing cycle;

FIG. 14 is a fragmentary schematic plan sketch, with parts omitted and parts broken away, illustrating a signal generator in accordance with a second embodiment of my invention;

FIG. 15 is a fragmentary schematic perspective sketch, illustrating a signal generator forming a part of the apparatus of FIG. 14; and FIG. 16 is a schematic fragmentary plan sketch, illustrating a third embodiment of a signal generator in accordance with my invention.

Figure 1:
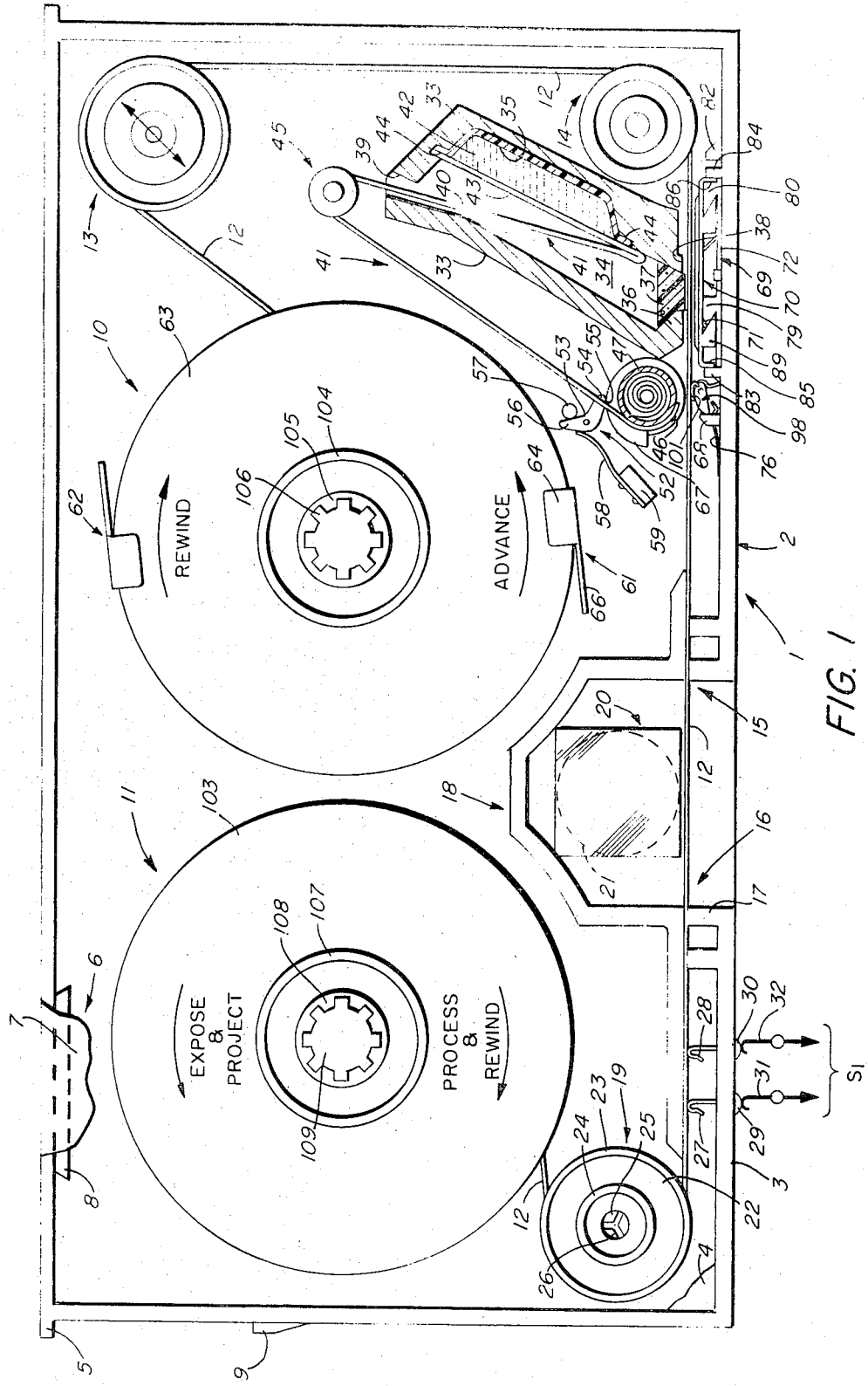
FIG. 1 is a schematic plan sketch, with parts omitted, parts shown in cross-section, and parts broken away, of a film cassette in accordance with my invention.

Referring now to FIG. 1, I have shown a film cassette in accordance with my invention and generally designated 1. The cassette 1 comprises a lighttight housing of metal, opaque plastic, or the like, which is formed in any conventional manner by a pair of interfitting housing parts that are made integral after assembly. These parts comprise a base portion, generally designated 2 and including a floor plate 4, fragmentarily shown in FIG. 1, that completes one side of the housing, and upstanding wall portions 3 that circumscribe the floor plate 4. The wall portions 3 are suitably configured to receive a cover, generally designated 6, and comprising a top panel 7 that completes a second side of the housing and is formed integral with wall portions 8 that cooperate and are interfitted with the wall portions 3 of the base to form with the base a lighttight housing. Light baffles, to be described, permit external connections through the cover panel 7 to certain of the elements within the housing, and also provide a film gate through which the film can enter and leave the housing for exposure and projection in a manner that will appear.

If made of metal, the base and cover parts 2 and 6 may be interlocked by cooperating detents formed in the parts in a conventional manner. If of plastic, the parts may simply be adapted to be fitted relatively closely together, and there sealed into integral relationship during final assembly of the apparatus.

The factor governing the location of the parting lines between the base and cover is simply manufacturing convenience. Specifically, it is convenient to take one portion, here shown as the base 2, as a platform upon which all of the additional fixed and moving parts to be described can be assembled in their initial operating relationship before the cover 6 is mounted on the base and there secured.

The base and cover portions preferably comprise portions cooperating to form a generally rectangular flange, schematically indicated at 5, and projecting from the cassette to provide a ledge engaging the periphery of a cooperating recess formed in the film drive and projection apparatus, to be described, to assist in registering and securing the cassette in that apparatus when desired. Along one portion of the side wall 3 of the base is formed a cam 9, serving in a manner to be described to actuate a switch forming a part of the film drive and projection apparatus when the cassette 1 is inserted into the housing of that apparatus.

Within the housing just described are rotatably mounted a film supply reel generally designated 10, and a film takeup reel generally designated 11. These reels may be formed with axial cylindrical bearing recesses in their base portions, not shown, to receive corresponding cooperating axles formed integral with the floor plate 4, to journal the reels for rotation in either direction about their central axes.

A supply of strip film 12 has one end connected to the spool, not shown, of the supply reel 10, and is initially unexposed and primarily coiled about the supply reel. The film extends from the supply reel over a conventional bobulator roll 13 that is resiliently mounted in the housing defined by the base 2 and cover 6 for both translation and rotation, to serve the conventional purpose of isolating a film drive pawl from the inertia of the supply reel as film is incrementally advanced by the pawl from the supply reel toward the takeup reel, for exposure in the camera, or for projection in the film drive and projection system. Such a drive pawl forms a part of both the camera, and of the film drive and projection apparatus, and will be described in somewhat more detail below.

For this purpose, the bobulator roll 13 is pivoted in a conventional manner to a support, not shown, that is in turn pivotably mounted on the floor plate 4, and is resiliently biased by conventional spring means so that the roll can move backwards and forwards in the general direction indicated by the double arrows to shorten or lengthen the film path as tension is released, or is relatively abruptly applied to the film, by the drive pawl. That action allows the supply reel to give up film at a more uniform rate, and thus experience smaller accelerations, than would be the case if the supply reel was driven directly by the film pawl during the incremental advance of the film. Since this construction and its function are well known to those skilled in the art, it will not be further described.

From the bobulator roll, the film passes about a conventional idler roll 14 journalled in the housing comprising the base 2 and cover 6. The idler 14 serves merely to rotate the direction of motion of the film through ninety degrees.

From the idler roll, the film is carried past a processing station, to be described, and thence, through a first light-baffled aperture generally designated 15, outside of the housing, and then, through a second light-baffled aperture schematically indicated at 16, back into the housing. The apertures 15 and 16 serve to form a film gate in which that portion of the film exposed between the apertures 15 and 16 can be selectively exposed in the camera, or projected, while being incrementally advanced by a pawl sequentially engaging sprocket holes in the film along a portion of the edge of the film in the film gate. A light-tight enclosure about the film gate is formed by wall means such as 17 formed integral with the walls 3 on one side of the housing, and by a wall generally designated 18 formed integrally with the floor plate 4 and, upon assembly, with the cover plate 7.

From the aperture 16, the film passes over a conventional snubber roll generally designated 19. The construction and function of the snubber roll will be briefly described below, but in general it performs the well known function of preventing movement of the film 12 onto the takeup reel, during camera exposure and subsequent projection, except when the film is released by actuation of the film drive pawl.

From the snubber roll, the film 12 passes to the takeup reel 11, whereon one end of the film is initially attached. As noted above, the film is initially stored primarily on the supply reel in its unexposed state. It is transferred primarily to the takeup reel during exposure, and subsequently rewound onto the supply reel. During the first rewinding operation on the supply reel after exposure, the film is processed, in a manner that will be described below.

In the external recess in the housing formed by the walls 17 and 18, and above the plane of the film extending through the film gate defined by the baffled apertures 15 and 16, there is provision for elements cooperating with camera and projector that are shown but fragmentarily, and which, being conventional, will only briefly be described. Essentially, in addition to the elements shown, there is a conventional pressure plate movably mounted in the recess formed by the wall 18 and adapted to engage the film 12 under the influence of a resilient biasing spring, not shown, attached to the housing. This plate serves as the pressure plate in a camera, for the purpose of locating the focal plane of the film, and is formed with an aperture to admit projection light through a defined frame during projection.

Projection light is transmitted through the film by external means, to be described, together with a prism generally designated 20 receiving collimated light through an aperture indicated at 21. The aperture 21 may be formed in the cover plate 7.

The prism 20 may comprise a block of optical glass or, preferably, of optically suitable transparent plastic, in which there is imbedded as the principle active element a mirror, not shown, which is disposed at 45° to the plane of FIG. 1. The function of the mirror is to reflect light supplied through the aperture 21 along paths normal to FIG. 1 at a 90° angle to the incident paths, to pass downwardly through the film 12 and thereby serve as a projection source of light for projection of the film after processing. If desired, the prism may comprise active optical faces, such as those shown and described in copending U. S. application for Letters Patent Ser. No. 118,963, filed on Feb. 25, 1971, by Herbert Bing for Unique Prismatic Element and Projection System and assigned to the assignee of this application.

The snubber roll 19 is provided at its lower end with a suitable cylindrical axial recess, not shown, adapted to receive a cooperating axle formed on the floor plate 4 to rotatably mount the snubber roll in the housing. On its upper surface, the snubber roll is provided with a flange portion 22 on which are mounted outwardly protruding annular flanges 23 and 24. The flanges 23 and 24 are adapted to cooperate with a depending annular flange, not shown, extending therebetween and formed integral with the cover plate 7. These interfitting annular flanges form a light-baffled aperture through which an actuating shaft 25 formed integral with the snubber roll may protrude through the housing.

The shaft 25 may be slotted as schematically indicated at 26 to receive a stop element, to be described in somewhat more detail below, that acts at times to prevent the snubber roll from rotating. The spool of the snubber roll 19, not shown, is preferably covered with a suitable material having a relatively high coefficient or friction, such as rubber, polyurethane, or the like, to assist in serving as a brake on the film 12.

As will appear, the emulsion side of the film 12 is in engagement with the various bobulator, idler and snubber rolls described. To prevent contact with the emulsion, it is preferred that the spools of these rollers be recessed in their central portions, so that the only contact made with the film is along the edges away from the photographically useful portion of the emulsion.

A signal generator for producing an external signal indicating whether or not the film in the cassette 1 has been processed is provided. This signal generator is generally designated S1, and is hereinafter sometimes referred to, and shown schematically as, a switch, for expository convenience. In the embodiment shown in FIG. 1, it comprises a pair of spaced and mutually insulated contacts 27 and 28, adapted to engage the film 12 along one edge thereof.

The contacts 27 and 28 are bridged at times, and under conditions, to be described, by a conductive strip formed on the edge of the film, so that the contacts at times present a closed circuit and at other times present an open circuit. The contacts 27 and 28 extend through the housing in the manner schematically indicated to external terminals 29 and 30, respectively. The terminals 29 and 30 are adapted to engage cooperating mutually insulated contact elements 31 and 32, respectively, that form a portion of the film drive and projection apparatus, to be described below.

The film 12 may comprise a base of any suitable transparent material of the kind conventionally used for film bases. On this base is applied, at least over the central portion of the photographically useable length of the film, an emulsion comprising a photosensitive coating, whereon a series of latent images may be formed with a camera.

Photosensitive coatings useable in the practice of my invention may be of any conventional variety adapted to be developed by a monobath processing composition to form a positive transparency suitable for projection. In particular, a currently preferred embodiment of my invention makes use of a film structure which, upon the base, comprises a photosensitive layer including both a photosensitive negative emulsion and an image-receiving layer to which a positive image may be transferred by diffusion during development without necessitating the subsequent removal of the emulsion containing its developed negative image. This highly desirable feature is made possible by a developed negative image having low covering power.

In typical silver transfer reversal processes for the projection of black and white images, a silver halide developer and a silver halide solvent are applied in an aqueous alkaline solution to a photoexposed silver halide stratum or emulsion, where they develop exposed silver halide to silver, and react with unreduced silver halide to form a soluble silver complex. This complex, in order to form a positive print, is transferred and reduced to silver on a silver-receptive stratum upon which the silver halide stratum has been superposed. In one practice, in the completion of this process, the silver-receptive and silver halide strata have been separated in order to render the positive print visible.

However, as indicated above, the positive print may be rendered visible without separation of the silver halide and silver-receptive strata. For example, the silver-receptive stratum may be so constituted as to provide an unusually vigorous silver precipitating environment which causes the silver deposited upon it, in comparison with silver developed in the silver halide stratum, to possess very high covering power; i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive prints in superposition provide a composite print that presents a good image for projection purposes so long as they are contained on a transparent support. Since the silver halide stratum and the silver receptive stratum need not be separated, an overall simplification of the silver transfer-reversal process is achieved.

A composite film assembly of this type, as well as processing compositions for producing a fully developed black and white image without the necessity of removing the developed negative image after processing, are shown in prior U. S. Pat. No. 2,861,885 to Edwin H. Land, which issued on Nov. 25, 1958 for Photographic Processes and Products. Other composite film assemblies capable of producing developed full color images without the necessity of removing the developed emulsion are shown in prior U. S. Pats. of Edwin H. Land, Nos. 2,726,154, issued Dec. 6, 1955, for Photographic Products, and 2,944,894, issued July 12, 1960, for Photographic Processes Utilizing Screen Members.

It should be noted that my invention is not directed to the chemistry by which images are developed in a photosensitive emulsion and transferred to an image receiving strata. However, in the practice of my invention, whether the film employs black and white or color film, at the present time the preferred embodiment of my invention employs film of a type not requiring the removal of a negative emulsion after it is developed.

The processing station referred to briefly above may comprise a particular form of drag coater that will next be described. The particular processing apparatus employed forms no part of my present invention, and the form shown is chosen primarily for convenience of exposition. Various other forms of coaters, such as reverse roll coaters and the like, and numerous variations in the details of the actuating mechanism therefor, can be employed without departing from the scope of my invention in its broader aspects, as will be apparent to those skilled in the art from the following description.

As shown, the film coating apparatus comprises an outer housing 33, formed by wall means initially integral with the floor plate 4 and made integral with the cover plate 7 during manufacture, after the cover plate has been put in place. The housing thus formed defines a chamber 34 in which an initially sealed container of processing composition, to be described, is mounted. The chamber 34 is formed at its lower end with an outlet nozzle 36 in which there is inserted a porous capillary wick element 37 that is adapted to absorb processing composition, to be described, and supply it for coating to the film. The wick 37, in its dry state prior to processing, is normally disengaged from the film 12.

Preferably, the trailing edge of the nozzle 36 is formed with a doctor bar 38 that serves to meter processing composition flowing through the wick 37 to the emulsion side of the film in a continuous coating of uniform thickness, relatively independent of the viscosity of the processing composition and of the linear speed of the film 12 relative to the nozzle. This uniform coating capability is characteristic of a doctor bar coater when used within reasonable limits of aperture and coating speed, and simplifies the control of the processing operation in a manner that will be obvious to those skilled in the art.

The upper end of the chamber 34 is pierced with an aperture 39 through which an upstanding end 40 of a tear-tab generally designated 41 protrudes. The tear-tab 41 may comprise a flexible strip of any suitable plastic chosen both to resist the chemical action of the processing composition, to be described, and to be sealable to the material, of similarly selected plastic, of which a composition containing receptacle 35, to be described, is formed.

The receptacle 35 is mounted in the outer container 33, and comprises a box-like structure filled with processing composition 42 that is initially sealed in place by an end portion 43 of the tear-tab 41. The end portion 43 of the tear-tab is heat-sealed, or otherwise detachably secured to, suitable flanges such as 44 formed on the periphery of the receptacle 35. As will appear, just prior to processing the film 12, the extending portion 40 of the tear-tab is drawn generally upwardly in FIG. 1, detaching at least a portion of the end 43 that initially seals the chamber 35 and thereby releasing the processing composition 42 so that it can flow down to, and be absorbed by, the wick 37.

The upstanding portion 40 of the tear-tab 41 extends out of the housing 33 about an idler roll 45 journalled in the housing comprising the base 2 and cover 6, and thence generally downwardly and to the left in FIG. 1 to a connection 46 with a spring driven tubular roller 47. As best shown in FIGS. 3 and 4, the roller 47 is provided with an internal slot to receive one end 48 of a spiral coil spring 49 that has its other end 50 fixed to in a cooperating slot formed in a shaft 51.

As best shown in FIG. 5, the shaft 51 is fixed in the housing plates 4 and 7, and is secured to or formed integral with a hub portion 51a and spacer portion 51b that serve to journal and support the roller 47 between the plates 4 and 7 for rotation about the shaft 51. The spring 49 is initially coiled relatively tightly about the shaft 51, so that when released, it will revolve the tubular roller 47 through several revolutions, winding the tear-tab 41 about the roller and thereby detaching at least a portion of the end 43 that seals the receptacle 35.

The roller 47 is initially restrained against rotation by a bellcrank generally designated 52 and rotatably mounted in the housing by means such as a pivot pin 53 formed integral with the floor plate 4. A protruding end 54 of the bellcrank 52 initially extends through a central aperture 55 formed in the tear-tab 41 and locks the tear-tab in place by engagement with a second arm 56 of the bellcrank 52 in engagement with a stop 57 formed integral with the floor plate 4.

The spring 49 acts as the primary force holding the bellcrank 52 in engagement with the stop 57 in the initial position of the parts. In addition, a relatively light spring 58 secured to a suitable support 59 formed integral with the floor plate 4 lightly urges the arm 56 of the bellcrank 52 against the stop 57.

The arm 46 of the bellcrank 52 is formed at its end with a cam engaging pawl 60 which cooperates at times with either of a pair of resilient fingers formed on cam elements generally designated 61 and 62, attached at intervals of 180° to a flange 63 formed on the supply reel 10. More or fewer of the cam elements such as 61 and 62 may be secured about the periphery of the flange 63, as desired. Since each of these elements may be identical to the others, only the cam element 61 will be described in detail.

As best shown in FIG. 2, the cam elements such as 61 may be formed of relatively light resilient spring material and comprise a flange element 64 secured in any conventional manner flush with the flange 63 in a suitable recess formed on the upper surface of the flange 63. The flange 64 extends to a depending arm 65 that carries a pawl engaging finger comprising an extension 66 extending generally tangentially of the reel 10 and between the upper flange 63 and a lower flange 67 of the spool 10 to engage the pawl 60 as the reel 10 is rotated.

When the supply reel 10 rotates in the advance direction indicated by the arrow in FIG. 1, or counterclockwise as seen in FIG. 1, the actuating arm 66 glances over the upper surface of the pawl 60 without moving the pawl or otherwise affecting the operation of the apparatus. ON the other hand, when the reel 10 is rotated clockwise in FIG. 1, in the rewind direction, the end 66 will engage the pawl 60 and carry the arm 56 counterclockwise in FIG. 1, causing the end 54 to initially move the tear-tab 41 slightly toward the idler 45, further tightening the spring 49. The end 54 then slips up out of engagement with the edge of the aperture 55 in the tear-tab 41, and allows the roller 47 to be driven counterclockwise in FIG. 1 under the influence of the spring 49. The tear-tab 41 is then wound rapidly about the roller 47, detaching at least a portion of the end 43 that initially seals the receptacle 35. When that occurs, the light spring 58 will be compressed, and the end 54 of the bellcrank 52 will ride up on the surface of the tear-tab, carrying the bellcrank 52 counterclockwise in FIG. 1 as the tear-tab 41 accummulates on the roller 47 to move the pawl 60 out of engagement with the cam elements such as 61 and 62, so that thereafter there is no interaction between these elements and the bellcrank.

A pair of cams 67 are formed on the ends of the tubular roller 47, as best shown in FIGS. 1, 3, 4 and 5. When the roller 47 is released in the manner described above, these cams 67 rotate to engage a pair of stops 68 formed integral with a cam block assembly generally designated 69 and drive the cam block assembly to the right in FIG. 1, for purposes to appear. Briefly, driving the cam block 69 to the right releases a pressure pad generally designated 70 so that it can be urged upwardly in FIG. 1 under the influence of a spring 71 and thereby urge the film 12 resiliently into engagement with the wick 37 and nozzle 36.

As best shown in FIG. 3, the cam block assembly 69 comprises a pair of side rails 72 interconnected by cross pieces 73 and 74 to form a rectangular sled. Depending portions of the side rails 72 engage cooperating slots 75 formed in the side wall 3 of the base member to guide the cam block 69 back and forth in the housing.

In the initial and final position of the cam block 69, as illustrated in FIGS. 1 and 3, the cam block 69 is resiliently held in place by a detent comprising a spring 76 secured in any conventional manner to the wall 3 and provided with a pair of resilient detent fingers 77 that engage the cross piece 73 and hold the assembly 69 in position until it is disengaged by engagement of the cams 67 with the stops 68.

Intermediate the ends of the rails 72 are formed a first pair of cam extensions 79, and near their ends are formed a second pair of cam extensions 80. These cams 79 and 80 cooperate with cams formed on the pressure pad 70, in a manner to be described, to hold the pressure pad secured in a lower position out of engagement with the film 12, as shown in FIG. 1, or to allow it to be raised under the influence of the spring 71 into engagement with the film 12, and, therethrough, with the nozzle 36.

Back stops 82 for the cam block assembly 69 are provided as integral extensions of the side wall 3 that engage the ends of the rails 72 when the cam block assembly 69 is moved to the right, to a rightmost extreme position shown in FIG. 8.

With reference to FIGS. 1, 3, and 6, the pressure pad 70 is retained for sliding movement up and down (as seen in FIG. 1) by a pair of guide members 83 and 84 formed integral with the wall 3. As shown in FIGS. 1 and 6, the pressure pad 70 is provided at its ends with downwardly depending end guide portions 85 and 86 to cooperate with these guides 83 and 84, respectively, allowing vertical sliding movement of the pressure pad 70 in FIG. 1 without lateral movement.

The central portion 87 of the pressure pad is formed as a raised, plane film engaging surface. About the periphery of this central portion 87 is a flange region 88 that carries thedepending guides 85 and 86.

Also formed on the sides of the pressure pad 70, and depending from the flange region 88, are pairs of cam portions 89 and 90 that cooperate with the cam portions 79 and 80, respectively, on the cam block assembly 69. In the position of the cam block assembly 69 shown in FIG. 1, the cams 79 and 80 hold the pressure pad 70 down out of engagement with the film 12 by their engagement with the cams 89 and 90. When the cam block assembly 69 is moved to the right in FIG. 1, into engagement with the end stop 82, as shown in FIG. 8, the pressure pad 70 is free to rise under the influence of the spring 71 to carry the film 12 into coating engagement with the nozzle 36.

Referring now to FIG. 7, the construction of the film useful in the apparatus of FIGS. 1–6 will next be described. As illustrated, the strip of film 12 is formed at one end with an aperture 91 of any suitable configuration to adapt it for connection to the supply reel 10. At the opposite end, a corresponding aperture 92 is formed to adapt to the film for connection to the takeup reel 11.

One edge of the film 12 is formed throughout, or substantially throughout, its length with a series of regularly spaced sprocket holes 93 adapted to cooperate with the film drive pawl of either the camera or of the film drive and projection system. This series is preferably interrupted, or interrupted and terminated, by an elongated sprocket hole 94, spanning, for example, a pair of the holes 93, and being thereby adapted to pass the drive pawl of the camera without engagement.

By that arrangement, advance of the film will be terminated by slippage of the drive pawl in the elongated sprocket hole, at least during exposure in the camera, at a predetermined exposure end point relative to its position on the supply and takeup reels. The film is preferably carried beyond that end point in the film drive and projection system, as by selective control of the snubber roll, in a manner to be described.

FIG. 7 shows the film 12 as seen from the base side. Illustrated by dotted lines is a region 95 on the opposite side of the film which is coated with a photosensitive emulsion of the type described above. If desired for manufacturing convenience, this region may be carried the length of the film; however, the portion shown is intended to illustrate that portion adapted for the formation of useful images. As a typical example, for 8 mm film the leader portion connected to the takeup end of the film, and the trailer portion connected to the supply end, may each comprise about 18 inches of film, whereas the usable portion covered by the emulsion 95 may be approximately 52 feet.

The contacts 27 and 28 described above are adapted to contact the film on its base side, and on the edge opposite the edge on which the sprocket holes 93 are formed. Along a region of this edge adapted to engage the contacts 27 and 28, there is formed a strip of metal foil 96 adapted to bridge the contacts 27 and 28 electrically when the film is in its exposed state and is stored primarily on the takeup reel.

Alternatively, the contacts 27 and 28 can be bridged by a corresponding strip of metal foil which extends over all regions of the film except that region adjacent the exposure termination point. The choice between these alternatives is one of convenience in design, and depends upon the particular nature of the electronic circuits, to be described, controlled by the contacts 27 and 28.

The selection of electronic circuits and components from those types most suited to the task at any particular time involves considerations that will be apparent to the artisan without further description. For clarity of exposition, my description will proceed on the assumption that the signal indicating that the film has been exposed is produced by a metal strip 96 bridging the contacts 27 and 28 to provide a conductive path therebetween.

The metal foil strip 96 may be confined to a relatively narrow region near the exposure termination point established by the camera, or it may extend over a substantial portion of the photographically useful length of the film. If the latter construction is adopted, any appreciable advance of the film beyond its unexposed initial position, in which it is stored substantially on the supply reel, will be detected as an exposed state, causing a partially exposed film that is deliberately removed from the camera prior to complete exposure to be processed as though it had been completely exposed.

In either event, the foil strip 96 is preferably terminated prior to the end point reached by the film drive and projection system in rewinding the film after projection. Thus, the signal that the film has not been processed, produced by the foil strip 96 bridging the contacts 27 and 28, is not presented except when the cassette is inserted into the projector at a time when it is neither in its initial position nor in the storage position assumed after rewind.

Formed on the leader portion adjacent to the takeup end of the film 12 is an aperture 97 that serves at times to disengage the processor after it has applied processing composition to the film. Referring to FIGS. 1 and 3, that occurs when the aperture 97 engages a hook 101 forming a part of a cam block return assembly generally designated 98.

As best shown in FIG. 3, the cam block return assembly 98 comprises a bellcrank 99 formed at one end with a slot 100 adapted to receive the film engaging hook 101. The bellcrank 99 is formed at its opposite end with a cam block engaging portion engaging the cam block assembly 69 in the initial position of the parts shown in FIGS. 1 and 3. For that purpose, the cross piece 73 forming a part of the cam block assembly is formed with a cooperating stop 103 adapted to engage the end of the bellcrank. The bellcrank 99 is resiliently and releasably retained, either in the position shown in FIGS. 1 and 3, or in an upright position shown in FIG. 8, by a detent comprising a spring member 102 secured in a cooperating slot in the base of the guide member 83.

The hook 101 is formed with a bight adapted, in the upright position of the bellcrank shown in FIG. 8, to lightly engage the base of the film 12 without interference with its progress towards the supply reel, during rewinding, until engagement by the aperture 97 (FIG. 7) towards the end of the first rewind of the film onto the supply reel. Prior to processing, and following processing, the hook 101 is out of engagement with the film, with the bellcrank in the position shown in FIG. 3.

Referring to FIG. 8, at the start of the first rewind operation, the cam block 69 will be moved to the right, into engagement with its back stops 82, to allow the pressure pad 70 to rise under the influence of the spring 71 as described above. At this time, the bell crank 99 will be moved by the stop 103 on the cross piece 73 into its upright position.

During the processing operation carried out during the first rewind, the hook 101 will lightly engage the base of the film 12. Towards the end of the processing operation, as illustrated in FIG. 9, the hook engaging aperture 97 formed on the film 12 will encounter the hook 101. The hook will pass through and engage the trailing edge of the aperture 97, and follow the film to cause the bell crank 99 to be rotated, clockwise from the position shown in FIG. 8 to the position shown in FIG. 9, forcing the cam block 69 back into its initial position.

The cam block 69 is again detented by reengagement of the spring 76 with the cross piece 73, and so holds the pressure plate 70 back in its original position out of engagement with the film. During the restoration of the cam block 69 to its initial position, the hook 101 will carry the film downwardly, until it leaves the film as the detent 102 is reengaged with the bell crank to hold the bell crank in its initial, horizontal position while the film rises to its initial path of movement out of engagement with the hook 101.

As suggested in FIGS. 1, 8 and 9, and best shown in FIG. 2, the supply and takeup reels 10 and 11 are each adapted to be externally driven. Referring to FIG. 1, the supply reel 10 and the takeup reel 11 may be of identical construction, except that the upper flange 63 of the supply reel 10 carries the cam elements 61 and 62 described above, whereas the upper flange 103 of the takeup reel 11 is plain.

As shown in FIG. 1, the supply reel 10 has an annular upstanding flange 104 formed integral with the upper flange 63, and an upstanding hub portion 105 on which is integrally formed a further upstanding sprocket 106. A cooperating downwardly depending annular flange formed on the cover plate 7 is adapted to extend between the flange 104 and the hub 105 to form a light seal through which the sprocket 106 and its hub 105 can pass for external drive of the supply reel.

A similar light-baffling flange 107, hub portion 108, and drive sprocket 109 are formed on the takeup reel 11 for the same purpose. Further construction of the reels will be described with reference to FIG. 2, with specific reference to the construction of the supply reel 10, as other details of the takeup reel 11 may be identical with those of the supply reel.

Referring to FIG. 2, in addition to the details just described, the takeup reel 10 carries a lower flange 67 mentioned above. As noted above, a central recess is formed in the lower portion of the reel, and opens through the base of the flange 67, to cooperate with a corresponding axle formed on the floor plate 4, to mount the reel 10 for rotation in the housing.

Figure 10:
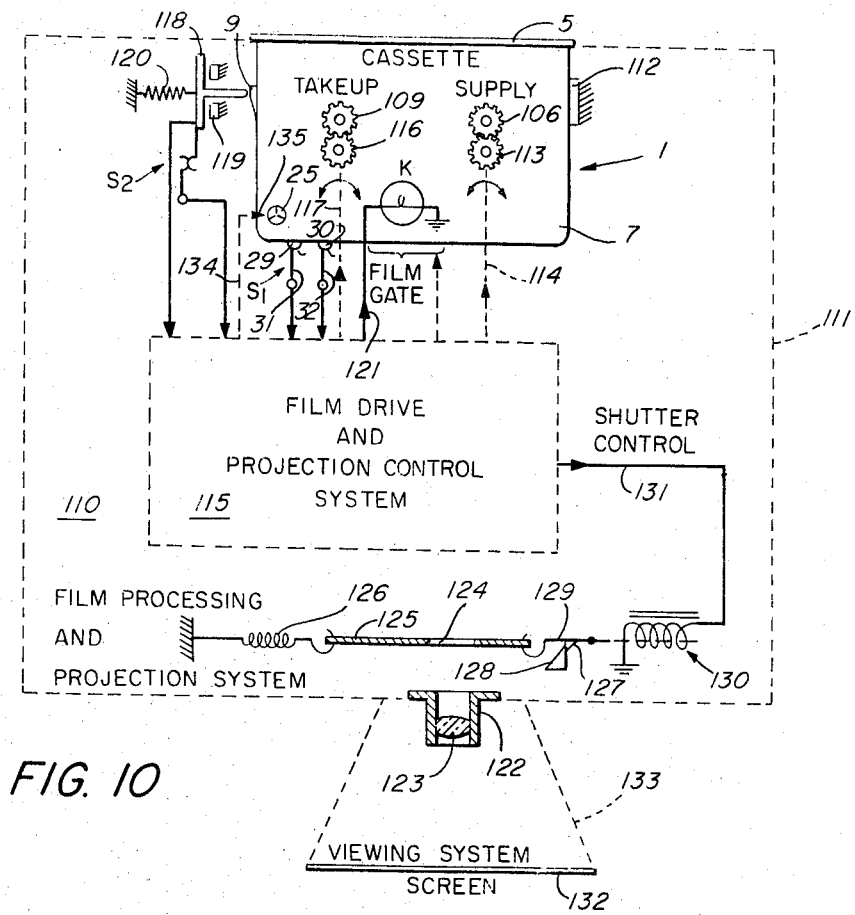
FIG. 10 is a schematic block and wiring diagram of a photographic system in accordance with my invention, comprising a film drive and projection system associated with a cassette, and illustrating the functional cooperation therebetween.

Referring now to FIG. 10, I have shown a film processing and projection system generally designated 110 that is completed by the insertion of a cassette 1 of the type described above. The system 110 comprises an outer opaque housing schematically indicated by the dotted line 111.

The housing 111 is formed with a suitable recess adapted to receive the cassette 1, and comprises suitable guide and support surfaces schematically indicated at 112, together with a suitable flange about the recess for receiving and cooperating with the outer flange 5 of the cassette 1. These parts hold and support the cassette in a predetermined position in the housing.

When inserted in the housing 111, the supply reel drive sprocket 106 is adapted to be engaged with a cooperating film drive sprocket 113. The drive sprocket 113 is connected to a drive shaft schematically indicated by the dotted line 114. The drive shaft 114 is adapted to be driven at times by rotation of the sprocket 106, and at other times is driven by a film drive and projection control system, to be described below, and generally designated 115. The takeup reel drive sprocket 109 is connected, upon insertion into the housing 111, with a driven sprocket 116 driven at times by the sprocket 109, and at other times by a shaft schematically indicated at 117 in response to operation of the film drive and projection control system 115.

The snubber roll hub 25 is adapted to be engaged at times by a stop 135 engaged by a shaft schematically shown at 134. The shaft 134 is actuated in a manner to be described by the film drive and projection control system 115. As will appear, the snubber stop 135 is engaged only during projection of the processed film.

When the cassette 1 is inserted in the housing 111, the terminals 29 and 30 engage the pair of contacts 31 and 32, described above, that are connected to and form a part of the film drive and projection control system 115. The group of contacts 31 and 32 and terminals 29 and 30 are collectively designated S1, and may be thought of as a switch which is opened when the film is processed and closed when it is unprocessed.

A normally open switch S2 is provided in the housing 111. The switch S2 is adapted to be closed by a spring-loaded actuating arm 118. When the cassette 1 is removed from the housing 111, the arm 118 is resiliently urged against stops 119 fixed with respect to the housing 111 by means here shown as a spring 120, with the switch S2 open. When the cassette 1 is inserted, the detent 9 described above engages a corresponding cooperating element formed on the arm 118 to close the switch S2, thereby providing a signal to the system 115 indicating that a cassette is present to complete the system 110.

A projection lamp K, which is assumed to be associated with a suitable condensing system for supplying a collimated beam of light to the prism 20 (FIG. 1) is adapted to be energized at times over a lead 121 extending from the system 115 through the filament of the lamp to ground.

Insertion of the cassette 1 in the housing 111 completes an enclosure that is lighttight except for a projection aperture here shown as defined by the barrel 122 of a projection lens assembly comprising a lens schematically indicated at 123. The projection aperture defined by the barrel 122 is normally open and exposed through a corresponding aperture 124 formed in a conventional opaque curtain shutter 125.

The shutter 125 is normally held in its open position, exposing the aperture in the barrel 122, by means here schematically illustrated as a tension spring 126 urging the shutter 125 to its open position, where it is held by a detent 127 engaging a stop 128. The detent 127 is carried by an actuating arm schematically indicated at 129 adapted to be moved to the right in FIG. 10 when a solenoid winding 130 is energized by current supplied over a lead 131 from the system 115, and through the winding 130 to ground. For that purpose, the actuating arm 129 may be formed integral with, or connected to, the armature of the solenoid 130.

When the solenoid 130 is energized, the shutter 125 is drawn to the right in FIG. 10, closing the projection aperture that would otherwise admit light through the lens 123 to complete a lighttight enclosure formed by the housing 111 and the cassette 1. As will appear, when the shutter 125 is closed, the lamp K is de-energized.

The apparatus of FIG. 10 further comprises a viewing system comprising a screen 132. As schematically indicated, the screen 132 may be of the type through which an image is viewed by transmitted light. A screen of that type may be connected to the housing 111 by a housing member schematically indicated by the dotted line 133. For this purpose, the housing member 133 may comprise an opaque material, and the screen 132 may be of glass or the like provided with a diffusing surface upon which the lens 123 can focus an image of that portion of the film in the cassette 1 that is in the film gate and illuminated by the lamp K.

Alternatively, the viewing screen 132 may be of the reflection type adapted to be located apart from the housing 111 and supported by conventional means such as a tripod or the like. For that purpose, the barrel 122 would preferably be adapted to provide a focusing mount for the lens 123.

In either event, the optical system should be designed, as by the provision of suitable mirrors, by the choice of lens construction, focal length and aperture, and the like, in view of the constraint imposed by the desire that the cassette 1 be upright in the housing as shown in FIG. 10, and recalling that the emulsion side of the film is at that time facing upward, so that a screen 132 disposed in a generally vertical plane can be viewed either by transmitted or reflected light, as determined by the choice of screen, in an upright and appropriate right-to-left orientation.

Figure 11:
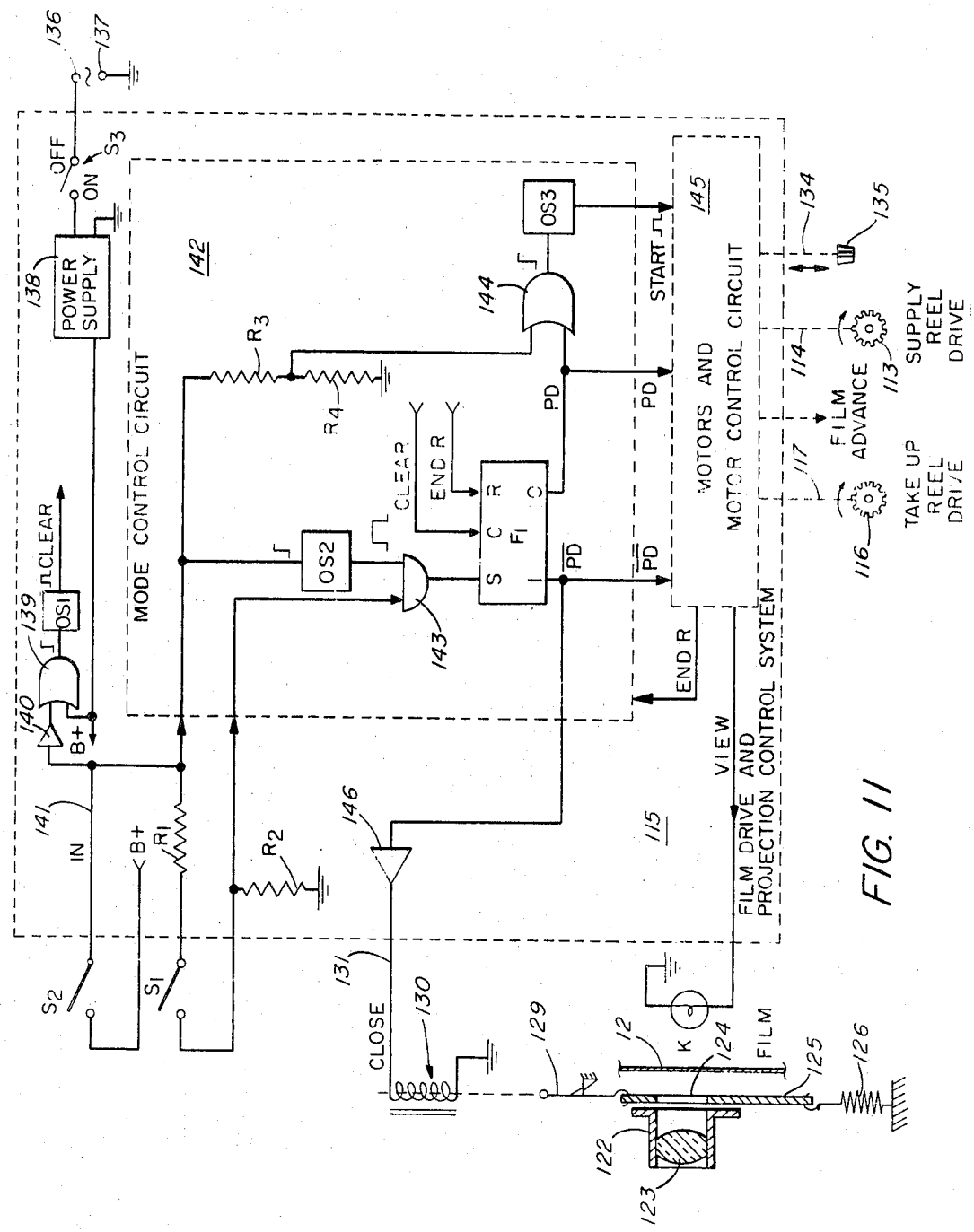
FIG. 11 is a schematic block and wiring diagram showing portions of the apparatus of FIG. 10 in more detail.

FIG. 11 shows further details of the film drive and projection control system 115. The apparatus is adapted to be supplied with electrical energy from any suitable source, here schematically illustrated as a conventional source of alternating current of, for example, 60Hz. at 120 volts, connected between an input terminal 136 and a grounded terminal 137. These terminals may be conveniently connected to a conventional power supply 138 over a conventional on-off switch S3, the latter being preferably mounted outside of the housing 111 in FIG. 10 in convenient position for actuation by the user.

The power supply 138 may be of any conventional construction adapted to convert the alternating current input supply to a convenient source of D.C. voltage at a potential shown as B+ with respect to ground. The exact value of the voltage B+ is not critical, but is preferably available at, for example, 24 volts, to provide relatively positive interrogation of the switch S1, which involves the detection of a bridging of contacts by metallic foil that may be associated with significant contact resistances prior to the establishment of current flow between the contacts.

The supply terminal at B+ is connected to one input terminal of a conventional OR gate 139 that has an output terminal connected to the triggering input terminal of a conventional one-shot multivibrator OS1. When the power supply 138 is first energized, the leading edge of the rising supply voltage B+ is thus caused to trigger the multivibrator OS1 to produce a positive CLEAR pulse, utilized in a manner to be described to clear several registers forming a part of the apparatus.

As will appear, the initial CLEAR pulse provided when the on-off switch S3 is closed serves to prevent premature operation of the takeup reel drive motor, to be described. A second CLEAR pulse is provided when a cassette is removed, to ensure that the apparatus is properly reset after operation, or in the event that the cassette is removed during operation. For that purpose, the supply terminal at B+ is connected over the switch S2 to the active input terminal of a conventional inverter 140. While a cassette is in the housing, the switch S2 is closed to provide a positive level labelled IN that remains until the cassette is again withdrawn, opening the switch S2. When that occurs, the inverter 140 produces a rising transition in response to the falling level at its input terminal, which transition is supplied to a second input terminal of the gate 139 to trigger the one-shot multivibrator OS1 to provide a second CLEAR pulse.

The lead 141, on which the signal labelled IN appears when the switch S2 is closed, supplies one input signal to a mode control circuit generally designated 142, to be described below. The lead 141 is also returned to ground through a second path closed when the switch S1 is closed and extending from the terminal 131 through a current limiting resistor R1, the switch S1 when closed, and a voltage determining resistor R2 to ground.

The resistor R1 is selected to have a relatively large value so that only a small current will flow through the switch S1 when closed, although the full supply voltage B+ will initially be present across the switch S1 to overcome any dry contact resistance that may be present. The resistor R2 is selected to produce a suitable output control voltage in response to closure of both switches S1 and S2, suitable for use in low-level logic circuits, such as conventional integrated circuits or the like, and on the order of magnitude of from 3 to 5 volts.

The voltage, if any, appearing across the resistor R2 is supplied as a second input signal to the mode control circuit 142. This signal is applied to one input terminal of a conventional AND gate 143. When a cassette is first inserted in the housing to close the switch S2, the AND gate 143 is temporarily enabled. That is accomplished by a pulse produced by a second one-shot multivibrator OS2 in response to the rising leading edge of the level IN produced when the cassette is first inserted. If the switch S1 is closed when the cassette is originally inserted, during the pulse produced by the multivibrator OS2 the gate 143 will produce an output signal setting a conventional flip-flop F1.

The flip-flop F1 may be of any conventional construction, adapted to be set to a state in which its logic one output terminal is at a positive potential with its logic zero output terminal at ground potential by a positive signal supplied to a set input terminal S. The flip-flop is adapted to be reset to its opposite state, either in response to a positive CLEAR pulse supplied to its clear input terminal C, or in response to a positive signal applied to its reset input terminal R.

When set, a positive level $\overline{PD}$ is produced at the logic one output terminal of the flip-flop F1, to indicate that a cassette has been inserted in the housing 115 which has not been processed. When reset, the flip-flop F1 produces a positive level PD at its logic zero output terminal to indicate that a cassette has been inserted in the housing 115 which has been processed. As will appear, this latter signal may appear either when a cassette of processed film is first inserted, or later, after unprocessed film in an inserted cassette has been processed.

The terminal 141 on which the signal IN appears is also connected across a potential divider, comprising a resistor R3 and a resistor R4 in series, to ground. The potential divider produces a voltage across the resistor R4 that is suitable for application to logic circuits, and in particular, is made compatible in amplitude with the signals produced at the output terminals of the flip-flop F1.

As shown, the signal appearing across the resistor R4 is applied to one input terminal of a conventional OR gate 144. A second input terminal of the gate 144 is connected to the logic zero output terminal of the flip-flop F1 to receive the signal PD. Upon the first appearance of either of these signals, the gate 144 produces a positive going output transition which triggers a third one-shot multivibrator OS3 to produce a positive output pulse labelled START.

The mode control circuit 142 supplies the signals $\overline{PD}$, PD and START pulse to motors and motor control circuits generally designated 145, to be described below. At times during the operation of the motors and motor control circuits 145, a pulse END R is produced by the circuits 145 and supplied to the circuit 142, where it serves to reset the flip-flop F1 for purposes to appear.

The signal $\overline{PD}$ appearing at the logic one output terminal of the flip-flop F1 is also applied to an input terminal of a conventional amplifier 146. The amplifier 146 produces operating current when the signal $\overline{PD}$ is present to energize the winding of the solenoid 130 and thereby close the shutter 125 as described above.

As schematically indicated in FIG. 11, the motors and motor control circuits 145 comprise means for driving the supply and takeup reel shafts 114 and 117, respectively, and for selectively energizing the snubber control shaft 134 at times to engage the stop 135 with the hub 25 of the snubber roll in the cassette. The circuits 145 also serve to produce an energizing current signal, labelled VIEW, for the energization of the projection lamp K when appropriate. Circuits for those purposes will next be described in connection with FIG. 12.

Figure 12:
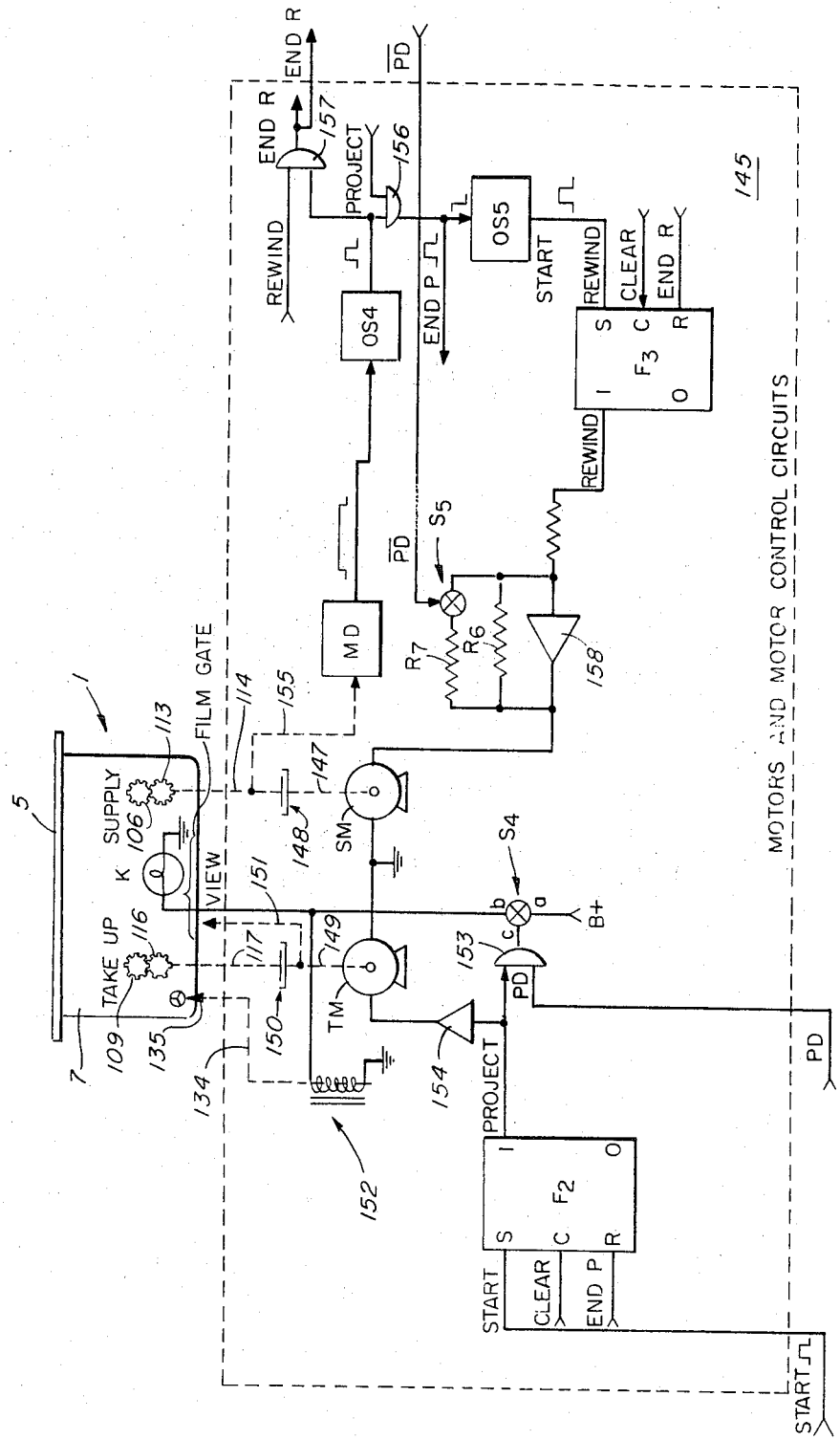
FIG. 12 is a schematic block and wiring diagram showing still further details of the apparatus of FIGS. 10 and 11.

Referring to FIG. 12, the motors and motor control circuits 145 are shown to comprise a first conventional DC motor SM having an output shaft schematically indicated at 147 which drives the supply reel shaft 114 through a conventional slip clutch 148. A second conventional DC motor TM is provided that has an output shaft schematically indicated at 149 which drives the takeup shaft 117 through a conventional slip clutch 150. The output shaft 149 also drives a conventional film advance pawl adapted to be connected to the portion of the film 12 exposed in the film gate of the cassette 1, through a conventional pawl drive mechanism schematically indicated by the dotted line 151. Although not shown, it is comtemplated that the film advance pawl drive mechanism will be driven in synchronism with a conventional shutter for the lens 123 that supplements the shutter 125 by blanking the projection aperture during projection while the film is advanced from frame to frame.

The projection lamp K is at times energized over a circuit extending from the supply terminal at B+ through the load terminals a and b of a conventional electronic switch S4, and thence through the filament of the lamp K to ground. When the switch S4 is closed, a parallel circuit is also completed through the winding of a conventional solenoid 152. The solenoid 152 has an armature formed integral with, or connected to, the shaft 134 that engages the stop 135 with the snubber roll hub 25 on the cassette 1 when the solenoid winding is energized.

The switch S4 may be of any conventional construction, and may, for example, comprise a power transistor whose collector and emitter serve as the load terminals a and b, and whose base serves as a control terminal c. The circuit may be such that a closed path is provided between the terminals a and b when a positive potential is applied to the input terminal c with respect to the load terminal b. Such a signal is at times provided by a conventional AND gate 153. The gate 153 has two input terminals, one receiving the signal PD that is positive when the flip-flop F1 in FIG. 11 is reset, and a second receiving a signal labelled PROJECT, positive when a flip-flop F2 is set.

The flip-flop F2 may be of the conventional variety described above in connection with the flip-flop F1 in FIG. 11. It is arranged to be set by the START pulse, and to be reset either by the CLEAR pulse applied to its input terminal C, or by a pulse END P applied to its input terminal R. When the flip-flop F2 is set, a positive level PROJECT is produced at its logic one output terminal.

The level PROJECT serves to enable the gate 153 to close the switch S4 at times when the level PD is present. The positive PROJECT level also serves as an input signal to a conventional motor drive amplifier 154 to cause the amplifier to supply energizing current to the motor TM, through a circuit that extends from the active output terminal of the amplifier 154 through the winding of the motor TM to ground.

The supply reel drive shaft 114 is connected by means, schematically indicated at 155, and which may comprise a commutator contact to be described below, to a motion detector MD. The motion detector MD is schematically shown in block form in FIG. 12, and will be described below in more detail in connection with FIG. 13.

The motion detector responds to motion of the shaft 114 in either direction to produce a positive output signal above ground that is restored to ground when motion ceases. Such motion of the shaft in one direction may occur when the supply motor SM is operated to drive the supply reel to rewind the film. The shaft 114 may rotate in the opposite direction when the takeup motor TM is energized to drive the shaft 117, together with the film pawl drive mechanism 151, to advance film onto the takeup reel, with consequent rotation of the supply reel and its associated sprockets 106 and 113.

The trailing edge of the signal produced when the motion detector MD is actuated triggers a conventional one-shot multivibrator OS4 to produce a positive output pulse. This pulse is applied to one input terminal of a conventional AND gate 156, and also to one input terminal of another conventional AND gate 157.

The second input terminal of the gate 156 receives the signal PROJECT, present when the flip-flop F2 is set. When both input terminals of the gate 156 are positive, a positive pulse END P is produced which serves to reset the flip-flop F2.

At the trailing end of the pulse END P, a conventional one-shot multivibrator OS5 is triggered to produce a positive output labelled START REWIND that sets a conventional flip-flop F3. The flip-flop F3 may be of the type described above, and is reset either by a CLEAR pulse supplied to an input terminal C, or by a pulse END R applied to its reset terminal R.

When set, the flip-flop F3 produces a positive signal labelled REWIND at its logic one output terminal. This signal is applied as the input signal to a conventional operational amplifier 158 comprising a variable, or at least selectively adjustable, feedback network.

In particular, in the embodiment here shown and described, the gain of the amplifier 158 is determined by a conventional input resistor R5 in combination with feedback resistance, which may conprise a single resistor R6, or the parallel combination of two resistors R6 and R7, effective when a conventional electronic switch S5 is closed. The switch S5 may be of the same conventional construction as that described above in connection with the switch S4, in that its load terminals, connected in series with the resistor R7, provide a closed circuit path when a positive signal, here labelled $\overline{PD}$, is applied to its control input terminal.

It will be recalled that the level $\overline{PD}$ is present at a positive value when the flip-flop F1 in FIG. 11 is set. As the gain of the amplifier 158 is determined by the ratio of its feedback resistance to its input resistance, it will be apparent that when the switch S5 is opened, a larger output signal will be produced by the amplifier 158 than when the switch S5 is closed.

The output signal from the amplifier 158 supplies operating current to the supply reel drive motor SM over a circuit extending from the active output terminal of the amplifier 158, through the winding of the motor SM, and thence to ground. The purpose of the gain adjustment just described is to control the rewind speed of the film in the cassette 1, to select a relatively slow speed suitable for processing when the film is being first rewound, by closure of the switch S5 to reduce the gain of the amplifier 158, and to select a conveniently higher rewind speed, for use with processed film.

The second input terminal of the gate 157 receives the signal REWIND, present when the flip-flop F3 is set. That signal enables the gate 157 to produce the pulse END R when the shaft 114 ceases motion at the end of rewind, having reached the end of the film on the takeup reel and thereby causing the clutch 148 to slip. The pulse END R resets the flip-flop F3. It also serves to reset the flip-flop F1 in FIG. 11, if this flip-flop has previously been set.

Figure 13:
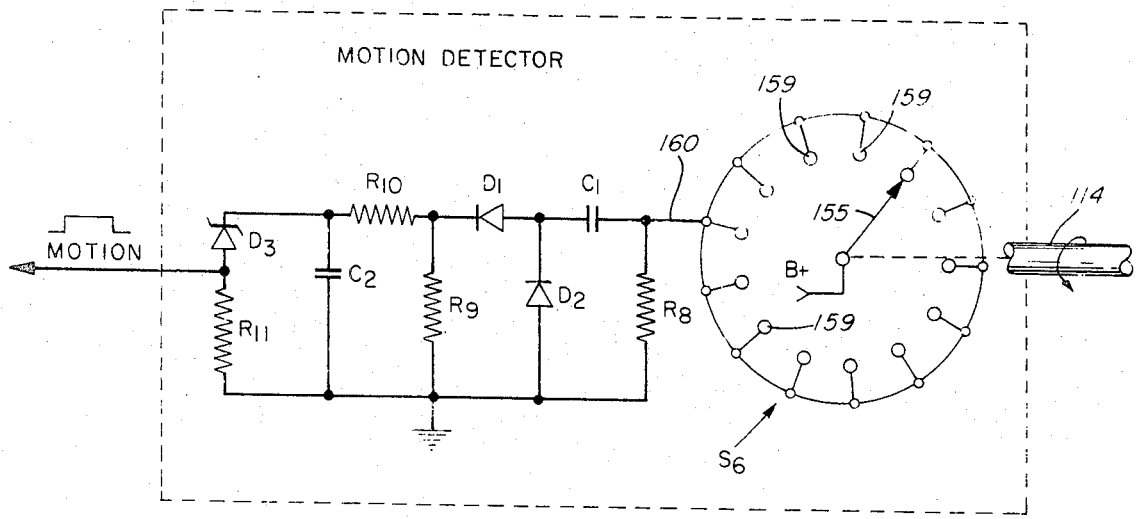
FIG. 13 is a schematic wiring diagram of a motion detector forming a portion of the appartus of FIGS. 10–12.

FIG. 13 shows the details of the motion detector MD. As shown, the apparatus receives a mechanical input from the shaft 114 by means of a connection to a commutator wiper 155 forming a portion of rotary switch S6 that includes a plurality of interconnected contacts 159 adpated to be sequentially engaged by the wiper 155 as the shaft 114 is rotated in either direction. Alternatively, as will be apparent to those skilled in the art, the contacts 159 can be formed as lands on the shaft 114, spaced by intermediate grooves filled with a suitable insulating material, such as an epoxy resin or the like. The commutator arm 155 may then be formed as a slidable contact sequentially engaging these lands on the shaft as it rotates.

The arm 155 is connected to the supply terminal at B+, and thereby supplies that voltage over any engaged one of the contacts 159 to a lead 160. The lead 160 is connected to ground over a first path extending in series through a capacitor C1, a diode D1, and a resistor R9. These components are so selected that the capacitor C1 is substantially fully charged, each time the wiper 155 engages one of the contacts 159, during the minimum dwell time of such engagement.

The minimum dwell time will occur at the most rapid shaft speed encountered, which occurs during the rewinding of processed film. Typically, for example, processing rewind may take from 30 to 40 seconds, projection about 3 ½ minutes, and storage rewind about 10 seconds. Designing the capacitor circuit for essentially full charging during each contact engagement makes the average voltage across the resistor R9 proportional to the angular velocity of the shaft.

A resistor R8 completes a second path from the lead 160 to ground. A third path extends through the capacitor C1 and from the cathode to the anode of a diode D2 to ground. A discharge path for the capacitor C1 thus extends side of the capacitor through the resistor R8, and thence from the anode to the cathode of the diode D2 and then to the other side of the capacitor C1. This discharge path is effective to discharge the capacitor c1 between engagements of the wiper 155 and the contacts 159.

A charging path for a second capacitor C2 extends from the lead 160 through the capacitor C1, through the diode D1 in its forward direction, through a resistor R10, and thence through the capacitor C2 to ground. The resistor R9 is connected between ground and the juncture of the resistor R10 and the diode D1. An ooutput circuit path extends across the capacitor C2, from its upper terminal through the cathode to the anode of a zener diode D3, and thence through a resistor R11 to ground and the lower terminal of the capacitor C2.

The capacitor C2 is thus charged through the resistor R10, each time the capacitor C1 is charged, to a voltage that increases with shaft speed and may approach B+ at higher shaft speeds. Between charging intervals, the capacitor C2 discharges through the resistor R10 in series with the resistor R9. The discharge time constant is selected to be long compared to the charging time constant. When the voltage across the capacitor C2 reaches and exceeds the breakdown voltage of the zener diode D3, current continuously flows through the zener diode and the resistor R11 to produce a positive MOTION signal across the resistor R11.

The components of the motion detector circuit are selected by conventional design methods such that when the wiper 155 is rotated by the shaft 114 at a speed at least equal to the slow rewind speed selected for processing, or at the projection takeup speed, whichever is the least, the capacitor C2 will be charged through the capacitor C1 and the the resistor R10 in series at a rate sufficient to exceed the breakdown voltage of the zener diode D3, causing an output signal to appear across the resistor R11 as long as the motion continues. When motion of the shaft 114 stops, the zener diode D3 will be blocked, causing the voltage across the resistor R11 to drop abruptly to ground. The output signal across the resistor R11 will thus exhibit sharp rise and fall times, although the amplitude of the signal during motion will be determined by the rate of motion. Since it is the fall time of this signal that is utilized in the circuit of FIG. 12, the amplitude of the signal produced during motion is not critical.

Having described the construction of one embodiment of my invention in detail, its operation will next be discussed in connection with FIGS. 1-13. For the purposes of illustration, and referring first to FIG. 10, it will be assumed that the cassette 1 is out of the housing 111, so that the switch S2 is opened. Referring to FIG. 1, assume that the cassette has been exposed in a camera, so that the film 12 is stored substantially on the takeup reel, and that the conductive metal foil element 96 (FIG. 7) is bridging the contacts 27 and 28 in FIG. 1, thereby providing a closed circuit between the external terminals 29 and 30 on the cassette 1.

Referring to FIG. 11, assume next that the switch S3 is closed to apply power to the supply 138, causing the supply voltage B+ to appear and thereby produce a transition through the gate 139 that will trigger the multivibrator OS1 to produce the CLEAR pulse. That pulse will reset the flip-flop F1 in FIG. 11 and the flip-flops F2 and F3 in FIG. 12, assuming that they are not already reset.

Next, assume that the cassette 1 is inserted in the housing 111 as illustrated in FIG. 10. The switch S2 will now be closed. At the same time, as the cassette is inserted, the terminals 29 and 30 will engage the contacts 31 and 32, causing the switch S1 in FIGS. 10 and 11 to be closed.

Referring to FIG. 11, when the switch S2 closes, the multivibrator OS2 will produce an output pulse, enabling the signal supplied through the now closed switch S1 to pass through the gate 143 and set the flip-flop F1. At the same time, the signal IN going positive in response to insertion of the cassette will trigger the multivibrator OS3 through the gate 144 to produce a START pulse.

The flip-flop F1 will now produce the signal $\overline{PD}$ and that signal, together with the START pulse, will be applied to the motors and motor control circuits 145. At the same time, the signal $\overline{PD}$ will cause operation of the solenoid 130 through the amplifier 146 to close the shutter 125. A lighttight enclosure about the portion of the film 12 exposed in the film gate of the cassette will thereby be provided.

Referring next to FIG. 12, the START pulse will set the flip-flop F2 and produce the level PROJECT to begin operation of the takeup motor TM through the amplifier 154. With the level PD absent, the gate 153 will not close the switch S4. Accordingly, neither the lamp K nor the solenoid 152 will be energized, and the snubber roll hub 25 will not be stopped.

The drive shaft 117 for the takeup reel will be driven, through the slip clutch 150. Referring to FIG. 1, rotation of the takeup reel 11 with the snubber roll 19 disengaged will allow the film to be advanced onto the takeup reel independently of the drive pawl. Until the film reaches its end on the supply reel 10, no further action of the system will take place because the detents 61 and 62 will be ineffective to actuate the pawl 60 during rotation in the advance direction.

Referring again to FIG. 12, as the takeup reel is rotated to withdraw film from the supply reel, the sprocket 106 of the supply reel will drive the sprocket 113 and the shaft 114, causing operation of the motion detector MD to produce a positive output level. That signal will persist until the end of the film on the supply reel is reached, at which point the slip clutch 150 will prevent further rotation of the shaft 117, and both takeup and supply reels will stop, causing the shaft 114 to stop.

The output signal of the motion detector will fall abruptly, triggering the multivibrator OS4 to produce its output pulse. In combination with the PROJECT signal supplied by the flip-flop F2 in its set state, the gate 156 will be enabled to produce the pulse END P, resetting the flip-flop F2. The pulse END P is selected in duration to enable the apparatus to stop before the signal level falls, and its trailing edge triggers the multivibrator OS5 to produce the START REWIND pulse that sets the flip-flop F3.

With the flip-flop F3 set, and the level $\overline{PD}$ still present, the amplifier 158 will be energized at low gain to drive the supply motor SM, and thereby drive the supply reel through the shaft 147, slip clutch 148, shaft 114 and sprockets 113 and 106, beginning the rewind of the film at a suitable processing speed.

Referring again to FIG. 1, shortly after the rewind operation is started by rotation of the supply reel 10, one of the detents 61 and 62 will engage the pawl 60 and cause it to release the tear-tab 41. The coil spring 49 (FIG. 4) will then drive the roller 47 (FIG. 1) counterclockwise, winding up the tear-tab 41 on the roller as suggested in FIG. 8 and pulling the tear-tab 41 away from the receptacle 35 to allow the processing composition 42 to flow down into contact with the wick 37.

As that is accomplished, the cams 67 will drive the cam block assembly 69 to the right in FIG. 1, and into the position shown in FIG. 8, in which the pressure pad 70 is raised to engage the film with the wick 37 and form an appropriate coating gap with the doctor bar 38.

Coating of the film 12 with processing composition 42 will then continue during rewind until, near the end of rewind, the aperture 97 in the film 12 will engage the hook 101, as illustrated in FIG. 9, causing the cam block 69 to move back to its initial position where it is retained by the detent spring 76. That will cause the pressure pad 70 to be restored to its initial position, and disengage the film.

While not described herein in detail, or illustrated, it is contemplated that during the processing cycle, the film drive and projection apparatus may supply heated air through suitable light-baffled apertures in the cassette housing to assist in drying the film after the coating of processing composition has been applied to it. However, it is desired to further this end by projecting the film with the light on shortly after it is processed. That further aids the drying process, but also serves the purpose of allowing the photographer to view his results quite soon after he has exposed the film in the camera.

Referring again to FIG. 12, during the first rewind of the film as described above, the motion detector MD will again produce an output signal. As the end of the film on the takeup reel is reached, motion will cease, and the multivibrator OS4 will again be triggered to produce its output pulse.

The flip-flop F2 is now reset, and the gate 156 will be disabled. However, with the flip-flop F3 set, the level REWIND will enable the gate 157 to produce the pulse END R, which resets the flip-flop F3. That will cause the supply drive motor SM to stop.

Referring now to FIG. 11, the pulse END R will also reset the flip-flop F1, producing the level PD. The leading edge of this signal applied through the gate 144 will trigger the multivibrator OS3 to produce another START pulse.

With the flip-flop F1 reset, the level $\overline{PD}$ will disappear, and the solenoid 130 will be deenergized. Accordingly, the shutter 125 will open.

The switch S1 in FIG. 11 may open or close at various times during the operation as described. However, those transitions have no effect on the operation of the system following the initial insertion of the cassette into the housing 111 (FIG. 10), because the switch S1 is sampled only during the pulse produced by the multivibrator OS2 when the cassette is inserted Referring again to FIG. 12, the second START pulse will set the flip-flop F2 to again produce the PROJECT level. That will cause the takeup motor TM to be operated as before.

At the same time, with the signal PD present, and the PROJECT level present, the gate 153 will close the switch S4. That will cause the projection lamp K to be energized, and will also energize the solenoid 152 to engage the stop 135 with the hub 25 of the snubber roll. That action renders the film pawl drive mechanism 151 effective to incrementally advance the film onto the takeup reel for projection purposes.

The processed images on the film will accordingly be projected in sequence on the screen 132 in FIG. 10, so long as the motion detector MD produces its output signal indicating that the supply reel drive shaft 114 is still in motion. When that motion is terminated, as by engagement of the film drive pawl with the elongated slot 94 in the film (FIG. 7), motion will stop. The motion detector transition produced in the circuit of FIG. 12 will then trigger the one-shot multivibrator OS5 to set the flip-flop F3, and commence a second rewind operation.

With the level $\overline{PD}$ absent, the switch S5 will be open, and the amplifier 158 will operate with higher gain to rapidly rewind the film by operation of the motor SM. At the end of rewind, when the clutch 148 slips, as the end of the film on the takeup reel is reached, a final pulse will be produced by the multivibrator OS4 to produce a final pulse END R that will reset the flip-flop F3 and restore the apparatus to its initial condition.

Operation of the apparatus of my invention in response to the insertion of a cassette containing processed film is the same as described above in connection with the second cycle of operation following processing. Specifically, referring to FIG. 11, the switch S1 will not be closed when the cassette is inserted, and the flip-flop F1 will not be set. Accordingly, the first START pulse, produced when the multivibrator OS3 is triggered through the gate 144 by the leading edge of the IN pulse occurring when the switch S2 is closed as the cassette is inserted, will be the only START pulse produced during the operating cycle. Thus, the processed film in the cassette will simply be projected for viewing, and then rewound for storage.

Referring next to FIG. 14, I have shown a modification of the apparatus in the cassette for producing the signal indicating whether or not the film in the cassette has been processed. Apparatus corresponding in structure and function to the first embodiment above described will be given the same reference characters, while those parts which are additional to or modified from those previously described are given new reference characters.

In particular, the cassette comprises a housing including a base portion, including the floor plate 4 and side walls 3, as described above, except as modified in a manner to be described. The path of the film 12 over the idler 14, past the processing station comprising the outer housing 33 and its associated parts described above, through the film gate defined by the apertures 15 and 16, and around the snubber roll 19, may be the same as described above.

The contacts 27 and 28, engaging the film 12, are adapted to engage a foil strip on the film 12 for the purposes described above. As before, the contact 27 is connected through the housing wall 3 to an external terminal 29 that engages the contact 31 in the film drive and projection apparatus. However, the contact 28, although engaging the film for the same purposes described above, is not directly connected to the external terminal 30 which engages the contact 32 of the film drive and projection apparatus. Rather, the contact 28 is connected over a lead 161, preferably carried in a suitable recess formed for the purpose in the floor plate 4, to a contact 162 adapted to engage the tear-tab 41, as in the region in which it passes over the idler 45.

A second contact 163 also engages the tear-tab 41, in spaced relation to the contact 162. The contacts 162 and 163 are mounted in any convenient manner in fixed relationship to the floor plate 4 for resilient engagement with the tear-tab 41.

The contact 163 is connected over a conductor 164, also preferably carried in a suitable recess formed in the floor plate 4, to the external terminal 30. A series path thus extends between the terminal 29, over the contacts 27 and 28 in their bridged condition, over the contacts 163 and 162 in their bridged condition, the latter occurring under conditions to be described, and thence to the terminal 30.

Referring to FIG. 15, the contacts 162 and 163 are adapted to be bridged at times by a strip of metal foil 165. The foil strip 165 is connected to the tear-tab 41, as by heat sealing, by means of a suitable adhesive, or the like, at such a location that it bridges the contacts 162 and 163 in a selected position of the tear-tab.

In the illustrated embodiment to be described, the contacts 162 and 163 may be assumed to be bridged by the foil strip 165 before the tear-tab 41 has been moved to open the container of processing composition. Thus, the switch S1a formed between the terminals 29 and 30 by the contacts 27 and 28 and the contacts 162 and 163 in series is closed when and only when both the film has been advanced from its initial position on the supply reel, indicating that the film has been at least partially exposed, and the tear-tab 41 has not been moved, indicating that the film has not been processed.

The signal produced by the switch S1a provides a more positive indication than that previously described, at the expense of a slight increase in complexity of the cassette, but otherwise may perform exactly the same functions described above in connection with the switch S1 in the circuits and system described. That is, the swtich S1a is interrogated only when the cassette is first inserted in the housing, and at that time selects the mode of operation of the film drive and projection apparatus to process the film and then project it, or simply to project it. As before, operation in either mode terminates after the film is rewound on the supply reel for storage and subsequent reuse.

FIG. 16 illustrates a further embodiment of the mode control switch in accordance with my invention. As shown, in accordance with this embodiment, only the tear-tab engaging contacts 162 and 163 are employed. These are adapted to be bridged by a foil strip 165 in the manner illustrated in FIG. 15. However, they are used alone and are connected to external terminals 29a and 30a, respectively, by connections through the wall 3. The terminals 29a and 30a are adapted to engage contacts 31a and 32a, corresponding to contacts 31 and 32 described above, to form a switch S1b that is closed when and only when the tear-tab 41 has not been moved. This construction of the switch has the advantage of simplicity, but of course will not prevent the processing of unexposed film. Otherwise, its function in the circuits and system described above is identical with the other forms of indicating switch described, and its operation in the system will be apparent without further description.

While I have described my invention with respect to the details of various illustrative embodiments thereof, many changes and variations will occur to those skilled in the art upon reading my description, and such can obviously be made without departing from the scope of my invention.

Having thus described my invention, what I claim is:

1. A photographic cassette, comprising an opaque housing, means forming a film gate in said housing, takeup and supply reels rotatably mounted in said housing, a strip of film having ends connected to said takeup and supply reels and extending therebetween through said film gate, said film being initially unexposed and primarily coiled on said supply reel and said cassette being adapted to cooperate with a camera for selective exposure of portions of said film in said film gate as said film is advanced onto said takeup reel, processing means in said housing responsive to manipulation of said film in said housing following its initial advance from said supply reel toward said takeup reel to apply processing composition to said film as it is first rewound onto said supply reel, said processing means comprising an actuating element, means responsive to movement of said film in said housing for moving said actuating element from a first position to a second position prior to processing said film, said processing means further comprising an initially sealed container of film processing composition, said actuating element comprising means for opening said container as said actuating element moves from its first to its second position, and an electric signal generating means in said housing responsive to manipulation of said film in said housing for producing a first signal or a second signal according as said film has not or has been processed, respectively, said signal generating means comprising at least one conductive element connected to said actuating element for movement therewith, and a pair of electrical contacts in said housing engaging said actuating element and being bridged by said conductive element in one of said positions of said actuating element, said container comprising wall means forming a receptacle open at one side, flange means formed on said receptacle surrounding said sides, a flexible tear-tab having one end initially sealed to said flange means to form a closed container with said receptacle, and a charge of film processing composition initially enclosed in said container by said tear-tab, in which said actuating element comprises a portion of said tear-tag extending beyond said flange means and means responsive to movement of said film toward said supply reel for applying a force to said extending portion to detach at least a portion of said tear-tab from said flange means to open said container, and in which said conductive element comprises a flexible metallic strip attached to said extending portion of said tear-tab.

2. In combination, a photographic cassette, said cassette comprising an opaque housing, means forming a film gate in said housing, takeup and supply reels rotatably mounted in said cassette housing, a strip of film having ends connected to said takeup and supply reels and extending therebetween through said film gate, said film being initially unexposed and primarily coiled on said supply reel and said cassette being adapted to cooperate with a camera for selective exposure of portions of said film in said film gate as said film is advanced onto said takeup reel, processing means in said cassette housing responsive to manipulation of said film in said cassette housing following its initial advance from said supply reel toward said takeup reel to apply processing composition to said film as it is first rewound onto said supply reel, and electrical signal generating means in said cassette housing responsive to manipulation of said film in said cassette housing for producing a first signal or a second signal according as said film has not or has been processed, respectively, a second housing adapted to receive said cassette housing, said second housing comprising opaque wall means adapted to form an enclosure about said film gate when said cassette housing is inserted in said second housing, means forming a projection aperture in said wall means, normally open shutter means operable to close said projection aperture, light source means in said second housing effective when said cassette housing is received in said second housing and energizable to transmit a beam of light through said film in said film gate toward said projection aperture, cyclic drive means in said second housing operatively connected to said reels when said cassette housing is received in said second housing and responsive to an applied signal to sequentially advance said film substantially all onto said takeup reel and then rewind said film substantially all onto said supply reel, means controlled by said signal generating means when said cassette housing is received in said second housing and responsive to said first signal for applying a signal to said cyclic drive means and operating said shutter means to close said aperture, and means controlled by said signal generating means when said cassette housing is received in said second housing and responsive to said second signal for applying a signal to said cyclic drive means and energizing said light source means at least while said film is advanced onto said takeup reel.

3. The apparatus of claim 2, in which said signal generator comprises a pair of electrical contacts in said cassette housing, each conductively connected through said cassette housing to an external terminal, and a conductive element in said cassette housing movable in response to manipulation of said film between positions engaging and bridging said contacts and positions out of engagement with at least one of said contacts, and in which one of said signals comprises a conductive path between said external terminals and the other of said signals comprises an open circuit between said terminals.

4. In combination, a photographic cassette, said cassette comprising an opaque housing, means forming a film gate in said cassette housing, takeup and supply reels rotatably mounted in said cassette housing, a strip of film having ends connected to said takeup and supply reels and extending therebetween through said film gate, said film being initially unexposed and primarily coiled on said supply reel and said cassette being adapted to cooperate with a camera for selective exposure of portions of said film in said film gate as said film is advanced onto said takeup reel, processing means in said cassette housing responsive to manipulation of said film in said cassette housing following its initial advance from said supply reel toward said takeup reel to apply processing composition to said film as it is first rewound onto said supply reel, and electrical signal generating means in said cassette housing responsive to manipulation of said film in said cassette housing for producing a first signal or a second signal according as said film has not or has been processed, respectively, said signal generator comprising at least one conductive element connected to said film and a pair of mutually insulated electrical contacts in said cassette housing extending to electrical terminals outside of said cassette housing, said contacts engaging said film and being bridged by said conductive element over a predetermined range of positions of said film in said cassette housing, and a second housing adapted to receive said cassette housing, said second housing comprising opaque wall means adapted to form an enclosure about said film gate when said first housing is inserted in said second housing, means forming a projection aperture in said wall means, normally open shutter means operable to close said projection aperture, light source means in said second housing effective when said cassette housing is received in said second housing and energizable to transmit a beam of light through said film in said film gate toward said projection aperture, cyclic drive means in said second housing operatively connected to said reels when said cassette housing is received in said second housing and responsive to an applied signal to sequentially advance said film substantially all onto said takeup reel and then rewind said film substantially all onto said supply reel, means controlled by said signal generating means when said cassette housing is received in said second housing and responsive to said first signal for applying a signal to said cyclic drive means and operating said shutter means to close said aperture, and means controlled by said signal generating means when said cassette housing is received in said second housing and responsive to said second signal for applying a signal to said cyclic drive means and energizing said light source means at least while said film is advanced onto said takeup reel.

5. In combination, a photographic cassette, said cassette comprising an opaque housing, means forming a film gate in said cassette housing, takeup and supply reels rotatably mounted in said cassette housing, a strip of film having ends connected to said takeup and supply reels and extending therebetween through said film gate, said film being initially unexposed and primarily coiled on said supply reel and said cassette being adapted to cooperate with a camera for selective exposure of portions of said film in said film gate as said film is advanced onto said takeup reel, processing means in said cassette housing responsive to manipulation of said film in said cassette housing following its initial advance from said supply reel toward said takeup reel to apply processing composition to said film as it is first rewound onto said supply reel, and electrical signal generating means in said cassette housing responsive to manipulation of said film in said cassette housing for producing a first signal or a second signal according as said film has not or has been processed, respectively, said processing means comprising an actuating element, means responsive to movement of said film in said cassette housing for moving said actuating element from a first position to a second position prior to processing said film, said signal generating means comprising at least one conductive element connected to said actuating element for movement therewith, and a pair of electrical contacts in said cassette housing engaging said actuating element and being bridged by said conductive element in one of said positions of said actuating element, and a second housing adapted to receive said cassette housing, said second housing comprising opaque wall means adapted to form an enclosure about said film gate when said cassette housing is inserted in said second housing, means forming a projection aperture in said wall means, normally open shutter means operable to close said projection aperture, light source means in said second housing effective when said cassette housing is received in said second housing and energizable to transmit a beam of light through said film in said film gate toward said projection aperture, cyclic drive means in said second housing operatively connected to said reels when said cassette housing is received in said second housing and responsive to an applied signal to sequentially advance said film substantially all onto said takeup reel and then rewind said film substantially all onto said supply reel, means controlled by said signal generating means when said cassette housing is received in said second housing and responsive to said first signal for applying a signal to said cyclic drive means and operating said shutter means to close said aperture, and means controlled by said signal generating means when said cassette housing is received in said second housing and responsive to said second signal for applying a signal to said cyclic drive means and energizing said light source means at least while said film is advanced onto said takeup reel.

6. In combination, a photographic cassette, said cassette comprising an opaque housing, means forming a film gate in said cassette housing, takeup and supply reels rotatably mounted in said cassette housing, a strip of film having ends connected to said takeup and supply reels and extending therebetween through said film gate, said film being initially unexposed and primarily coiled on said supply reel and said cassette being adapted to cooperate with a camera for selective exposure of portions of said film in said film gate as said film is advanced onto said takeup reel, processing means in said cassette housing responsive to manipulation of said film in said cassette housing following its initial advance from said supply reel toward said takeup reel to apply processing composition to said film as it is first rewound onto said supply reel, and electrical signal generating means in said cassette housing responsive to manipulation of said film in said cassette housing for producing a first signal or a second signal according as said film has not or has been processed, respectively, said processing means comprising an actuating element, and means responsive to movement of said film in said cassette housing for moving said actuating element from a first position to a second position prior to processing said film, said signal generator comprising first and second electrical contacts in said cassette housing engaging said film, at least a first conductive element mounted on said film and bridging said first and second contacts over a predetermined range of positions of said film in said cassette housing, third and fourth electrical contacts in said cassette housing engaging said actuating element, at least a second conductive element connected to said actuating element for movement therewith and bridging said third and fourth contacts in one of said positions of said actuating element, a pair of mutually insulated electrical terminals extending through said cassette housing for cooperation with an external electrical circuit, and conductive means connecting said terminals to said first, second, third and fourth contacts over a series path closed to produce a first signal across said terminals when and only when said first and second contacts and said third and fourth contacts are bridged by said first and second conductive elements, respectively, and open to produce a second signal across said terminals when said first signal is absent, and a second housing adapted to receive said cassette housing, said second housing comprising opaque wall means adapted to form an enclosure about said film gate when said cassette housing is inserted in said second housing, means forming a projection aperture in said wall means, normally open shutter means operable to close said projection aperture, light source means in said second housing effective when said cassette housing is received in said second housing and energizable to transmit a beam of light through said film in said film gate toward said projection aperture, cyclic drive means in said second housing operatively connected to said reels when said cassette housing is received in said second housing and responsive to an applied signal to sequentially advance said film substantially all onto said takeup reel and then rewind said film substantially all onto said supply reel, means controlled by said signal generating means when said cassette housing is received in said second housing and responsive to said first signal for applying a signal to said cyclic drive means and operating said shutter means to close said aperture, and means controlled by said signal generating means when said cassette housing is received in said second housing and responsive to said second signal for applying a signal to said cyclic drive means and energizing said light source means at least while said film is advanced onto said takeup reel.

7. In a system for exposing, processing and projecting strip film, the combination comprising a first housing containing a strip of film connected at its ends to supply and takeup means and passing therebetween through a film gate for cooperation with a camera and with a projection system to be incrementally advanced from said supply means, said takeup and supply means being responsive to selectively applied drive energy to advance said film to said takeup means and return it to said supply means, respectively; film processing means located in said first housing adjacent said film and operable to engage said film and process it when the film is moved with respect to the processing means; means responsive to a condition determined by the state of said film in said housing for operating said processing means; electrical signal generating means controlled by said processing means for producing a first or a second electrical signal according as said processing means has not or has been operated, respectively; a projection system comprising a second housing formed to receive said first housing and form therewith a lighttight enclosure pierced by a projection aperture in said second housing; light source means mounted in said second housing and energizable to direct a beam of light toward said film gate when said first housing is inserted in said second housing; closure means adjacent said projection aperture in said second housing and actuable to close said projection aperture; first drive means in said second housing energizable when said first housing is inserted in said second housing to apply drive energy to said takeup means and intermittently engage said film in said film gate to advance said film to said takeup means; second drive means in said second housing energizable when said first housing is inserted in said second housing to apply drive energy to said supply means to transport said film to said supply means; sequencing means responsive to either said first signal or said second signal to energize said first drive means to transport substantially all of said film to said takeup means and then energize said second drive means to transport substantially all of said film to said supply means; means responsive to said first signal for actuating said closure means at least while said second drive means is energized; and means responsive to said second signal for energizing said light source means.

8. In combination, a first lighttight housing, a supply of strip film substantially contained in aid first housing and extending out of and back into said first housing through opposed light-baffled apertures, reversible film transport means connected to said film for moving it through said apertures in either direction over a substantial portion of its length, film processing means mounted in said first housing, control means mounted in said first housing and responsive to said film transport means for operatively connecting said processing means to said film, a second housing comprising wall means forming an enclosure adapted to receive said first housing and formed with a projection aperture, closure means operable to close said aperture, said wall means forming a lighttight enclosure about the portion of said film extending outside of said first housing when said closure means is operated, light source means in said second housing and energizable to direct light through the portion of said film outside said first housing toward said projection aperture, signaling means operatively connected to said first housing for producing a first or a second electrical signal according as said film is unprocessed or processed, respectively, reversible drive means in said second housing adapted to be connected to said film transport means and selectively energizable to drive said film in a first or a second direction, sequencing means responsive to an applied signal and effective when said first housing is received in said second housing for energizing said drive means first to transport said film in a first direction through said apertures and then to transport said film in a direction opposite said first direction through said apertures, means responsive to said first electrical signal and effective when said first housing is received in said second housing for operating said closure means, means responsive to said first signal and effective when said first housing is received in said second housing for applying a signal to said sequencing means, means responsive to said second signal when said first housing is received in said second housing for energizing said light source means, and means responsive to said second signal when said first housing is received in said second housing for applying a signal to said sequencing means.

9. A system for exposing, processing and projecting strip film, comprising a first housing, a supply reel and a takeup reel each rotatably mounted in said first housing, means forming a film gate in said housing, a strip of film having opposed ends, one of said ends being connected to said supply reel and the other of said ends being connected to said takeup reel, said strip passing between said reels through said film gate for cooperation with a camera and a projection system for exposing, processing and projecting said film, film processing means in said first housing operable to apply processing composition to said film as said film is transported from said takeup reel toward said supply reel, electrical signal generating means operatively connected to said processing means for producing a first or a second signal according as said processing means has not or has been operated, respectively, a second housing adapted to receive said first housing, said second housing comprising opaque wall means adapted to form an enclosure about said film gate when said first housing is received in said second housing, means forming a projection aperture in said wall means, normally open shutter means operable to close said projection aperture, light source means in said second housing effective when said first housing is received in said second housing and energizable to transmit a beam of light through said film in said film gate toward said projection aperture, cyclic drive means in said second housing operatively connected to said reels when said first housing is received in said second housing and responsive to an applied signal to sequentially advance said film substantially all onto said takeup reel and then rewind said film substantially all onto said supply reel, means controlled by said signal generator when said first housing is received in said second housing and responsive to said first signal for applying a signal to said cyclic drive means and operating said shutter means to close said aperture, and means controlled by said signal generator when said first housing is received in said second housing and responsive to said second signal for applying a signal to said cyclic drive means and energizing said light source means at least while said film is advanced onto said takeup reel.

10. Strip film processing and projection apparatus, comprising: a housing adapted to receive a film cassette containing a supply of strip film of which a portion is exposed through a film gate, film transport means actuable to advance the strip film in either a first or a second direction through the film gate, and means supplying an electrical signal indicating whether or not the film has been processed; cyclic drive means adapted to be operatively connected to the film transport means and responsive to an applied signal to advance the film in said first direction to a predetermined end point and then advance the film in said second direction to another predetermined end point; means forming a projection aperture in said housing; shutter means operable to close said aperture; light producing means in said housing energizable to project a beam of light through the film in the film gate through said projection aperture when a cassette is received in said housing; control means responsive to a cassette received in said housing and said electrical signal for applying a signal to said cyclic drive means and operating said shutter means when said signal indicates that the film has not been processed; and control means responsive to a cassette received in said housing and said electrical signal for applying a signal to said cyclic drive means and energizing said light producing means at least while most of the film is advanced in said first direction when said signal indicates that the film has been processed.

* * * * *